US011881647B2

(12) United States Patent
Ghim et al.

(10) Patent No.: US 11,881,647 B2
(45) Date of Patent: Jan. 23, 2024

(54) APPARATUS FOR CONNECTING MODULES INCLUDED IN ELECTRONIC DEVICE

(71) Applicant: Samsung Electronics Co., Ltd., Suwon-si (KR)

(72) Inventors: Jaegon Ghim, Suwon-si (KR); Jeongho Kang, Suwon-si (KR); Youngmin Lee, Suwon-si (KR); Yunbum Lee, Suwon-si (KR); Seongbeom Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 453 days.

(21) Appl. No.: 17/250,491

(22) PCT Filed: Jun. 11, 2019

(86) PCT No.: PCT/KR2019/006973
§ 371 (c)(1),
(2) Date: Jan. 27, 2021

(87) PCT Pub. No.: WO2020/022641
PCT Pub. Date: Jan. 30, 2020

(65) Prior Publication Data
US 2021/0305739 A1    Sep. 30, 2021

(30) Foreign Application Priority Data

Jul. 27, 2018  (KR) ........................ 10-2018-0087926
Nov. 22, 2018  (KR) ........................ 10-2018-0145580

(51) Int. Cl.
*H01R 12/79*    (2011.01)
*H01P 3/08*    (2006.01)
(Continued)

(52) U.S. Cl.
CPC ............... *H01R 12/79* (2013.01); *H01P 3/08* (2013.01); *H04B 1/0071* (2013.01); *H04M 1/0274* (2013.01)

(58) Field of Classification Search
CPC ............ H04M 1/0277; H04M 1/0249; H04M 1/0274; H04B 1/40; H04B 1/0071; H01R 12/79; H01P 3/08
See application file for complete search history.

(56) References Cited

U.S. PATENT DOCUMENTS 10,333,207 B2 * 6/2019 Lee ........................ H04H 20/62
2002/0051346 A1   5/2002 Asano et al.
(Continued)

FOREIGN PATENT DOCUMENTS

KR   10-2006-0005145 A    1/2006
KR      10-1004923 B1   12/2010
(Continued)

OTHER PUBLICATIONS

International Search Report and Written Opinion of the International Searching Authority in connection with International Application No. PCT/KR2019/006973 dated Sep. 25, 2019, 13 pages.
(Continued)

*Primary Examiner* — Jean F Duverne

(57) ABSTRACT

The disclosure relates to an apparatus for connecting modules included in an electronic device, and the apparatus may comprise: a power source between a first module of an electronic device and a second module of the electronic device; at least one line unit including lines for transferring a control signal, an intermediate (IF) signal, or a radio frequency (RF) signal; a first connector unit for connecting at least one of the lines to the first module; a second connector unit for connecting at least one of the lines to the second module; and a connection unit for connecting at least
(Continued)

one external apparatus and at least one line for transferring the IF signal or the RF signal from among the lines.

14 Claims, 36 Drawing Sheets

(51) Int. Cl.
*H04B 1/00* (2006.01)
*H04M 1/02* (2006.01)

(56) References Cited

U.S. PATENT DOCUMENTS

2004/0029406 A1 2/2004 Loveless
2011/0059695 A1 3/2011 Martch et al.
2015/0288113 A1 10/2015 Seo et al.
2015/0333724 A1* 11/2015 Lahti ............... H01P 1/201
                                                        343/860
2018/0017999 A1 1/2018 Kim et al.

FOREIGN PATENT DOCUMENTS

| KR | 20-2011-0007433 U | 7/2011 |
| KR | 10-2015-0115497 A | 10/2015 |
| KR | 10-2016-0059627 A | 5/2016 |
| KR | 10-2017-0105794 A | 9/2017 |
| KR | 10-2018-0008945 A | 1/2018 |

OTHER PUBLICATIONS

Notice of Preliminary Rejection dated Nov. 10, 2022, in connection with Korean Application No. 10-2018-0145580, 13 pages.
Notice of Patent Grant dated May 24, 2023, in connection with Korean Application No. 10-2018-0145580, 5 pages.

* cited by examiner

APPARATUS FOR CONNECTING MODULES INCLUDED IN ELECTRONIC DEVICE

CROSS-REFERENCE TO RELATED APPLICATIONS

This application is a 371 National Stage of International Application No. PCT/KR2019/006973, filed Jun. 11, 2019, which claims priority to Korean Patent Application No. 10-2018-0087926, filed Jul. 27, 2018, and Korean Patent Application No. 10-2018-0145580, filed Nov. 22, 2018, the disclosures of which are herein incorporated by reference in their entirety.

BACKGROUND

1. Field

Various embodiments of the disclosure relate to an apparatus for connecting modules included in an electronic device.

2. Description of Related Art

With the enhancement of digital technology, electronic devices are provided in various forms like smartphones, tablet personal computers (PCs), or personal digital assistants (PDAs), or the like. Furthermore, electronic devices are developing to be wearable on users to enhance portability and accessibility of users. Electronic devices (for example, electronic devices for communication) are popularly used in everyday life with the development of wireless communication technology, and accordingly, use of contents is exponentially increasing. An electronic device may include a member for electrically connecting between components related to a wireless communication circuit, such as a flexible printed circuit board (FPCB).

SUMMARY

An FPCB may be used to exchange signals between two different modules included in an electronic device. If the two modules perform functions for wireless communication, a line provided in the FPCB to transmit an intermediate frequency (IF) and/or radio frequency (RF) signal may need to be divided to connect a device for testing and optimizing performance. If a coaxial cable is used, the device for testing and optimizing performance may be connected to a port for connecting the coaxial cable. However, in the case of the FPCB, a power line, a control line, etc. are arranged in addition to the line for transmitting the IF/RF signal, and therefore, it may be difficult to divide only the line for the IF/RF signal.

Accordingly, various embodiments of the disclosure provide an apparatus for providing a port for testing performance without changing structures of modules connected.

According to various embodiments of the disclosure, an apparatus for connecting modules included in an electronic device may include: at least one line part including lines configured to transmit a power, a control signal, an IF (intermediate frequency) signal, or a radio frequency (RF) signal between a first module of the electronic device and a second module of the electronic device; a first connector part configured to connect at least one of the lines with the first module; a second connector part configured to connect at least one of the lines with the second module; and a connection part configured to connect at least one line for transmitting the IF signal or the RF signal from among the lines with at least one external device. The at least one line for transmitting the IF signal or the RF signal may include a first line connected to the first connector part to exchange signals with the first module, and a second line connected to the second connector part to exchange signals with the second module, and the connection part may include a first port connected with the first line and a second port connected with the second line.

The apparatus for connecting between modules according to various embodiments includes a port for connecting a line connected with modules with an external device, so that the modules can be tested and optimized without changing the modules.

DETAILED DESCRIPTION

Hereinafter, various embodiments will be described in detail with reference to the accompanying drawings.

Figure 1:
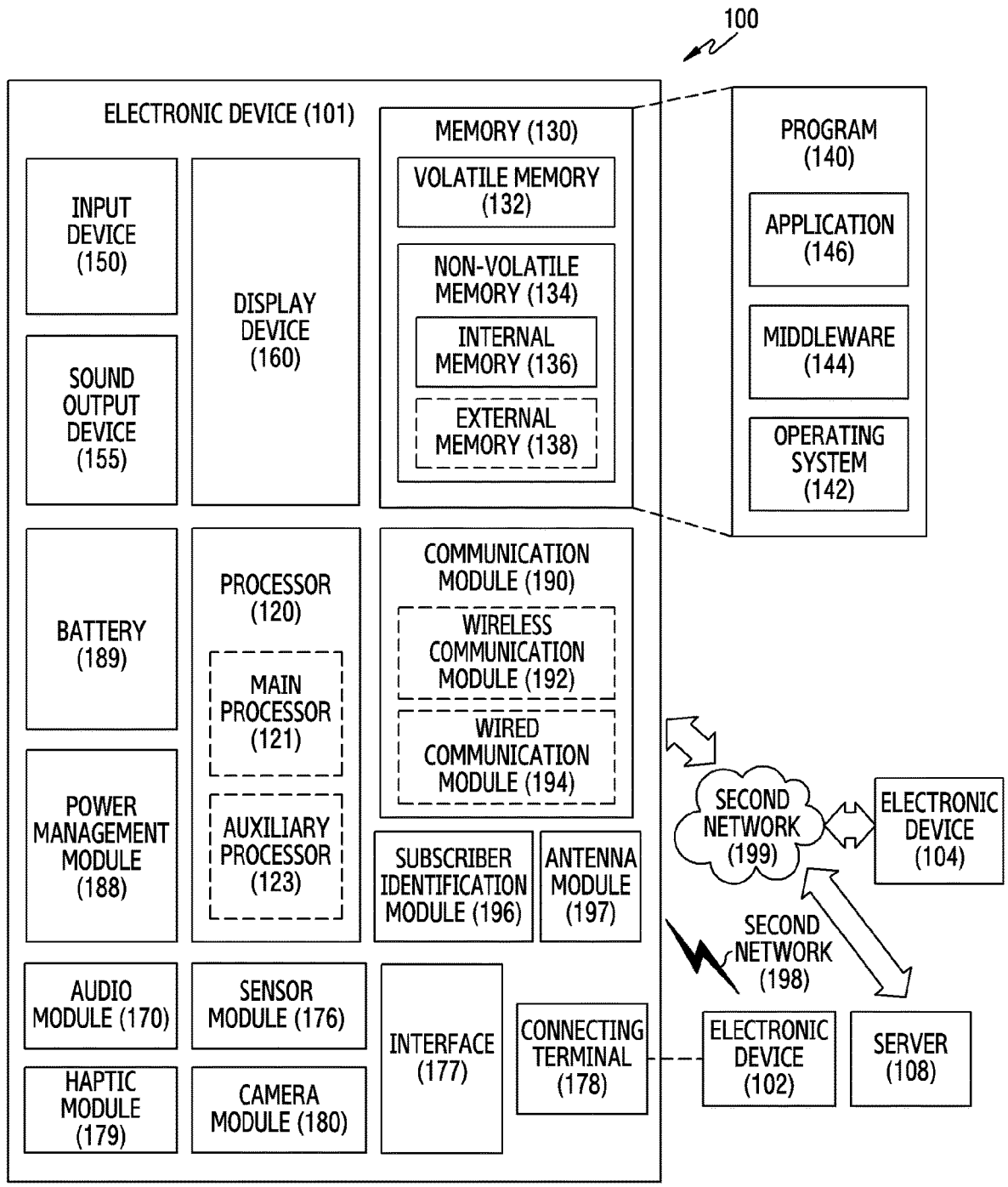
FIG. 1 is a block diagram of an electronic device in a network environment according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related therereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
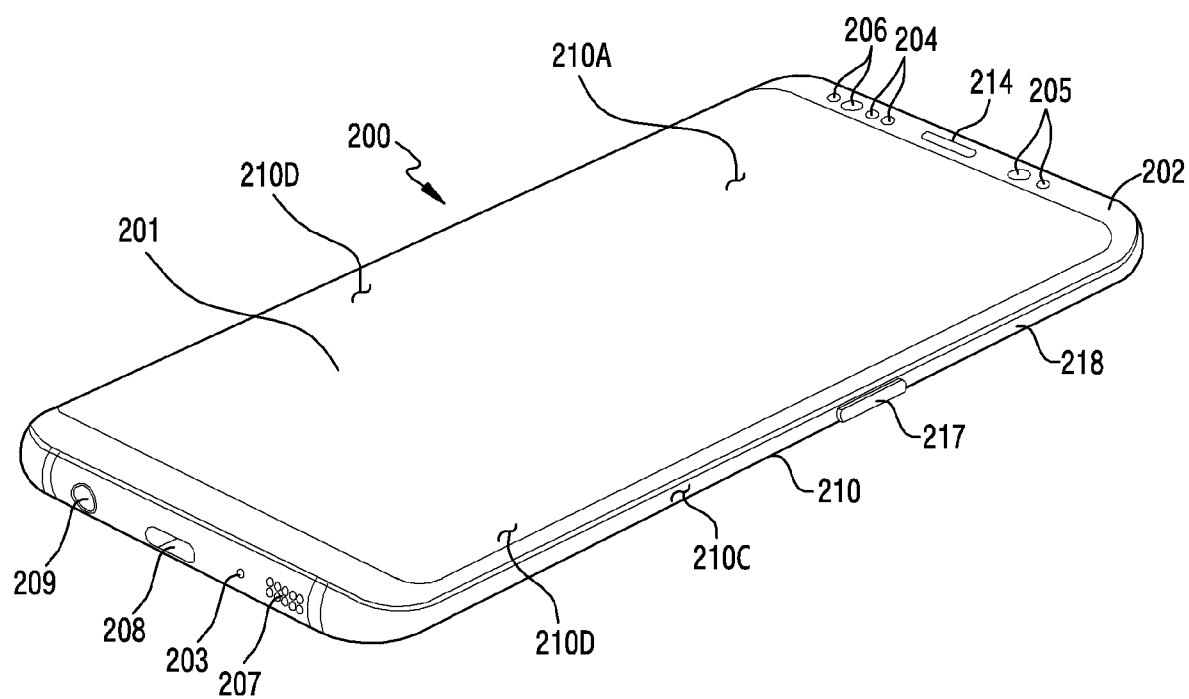
FIG. 2A is a perspective view of a mobile electronic device according to various embodiments of the disclosure.
Figure 2B:
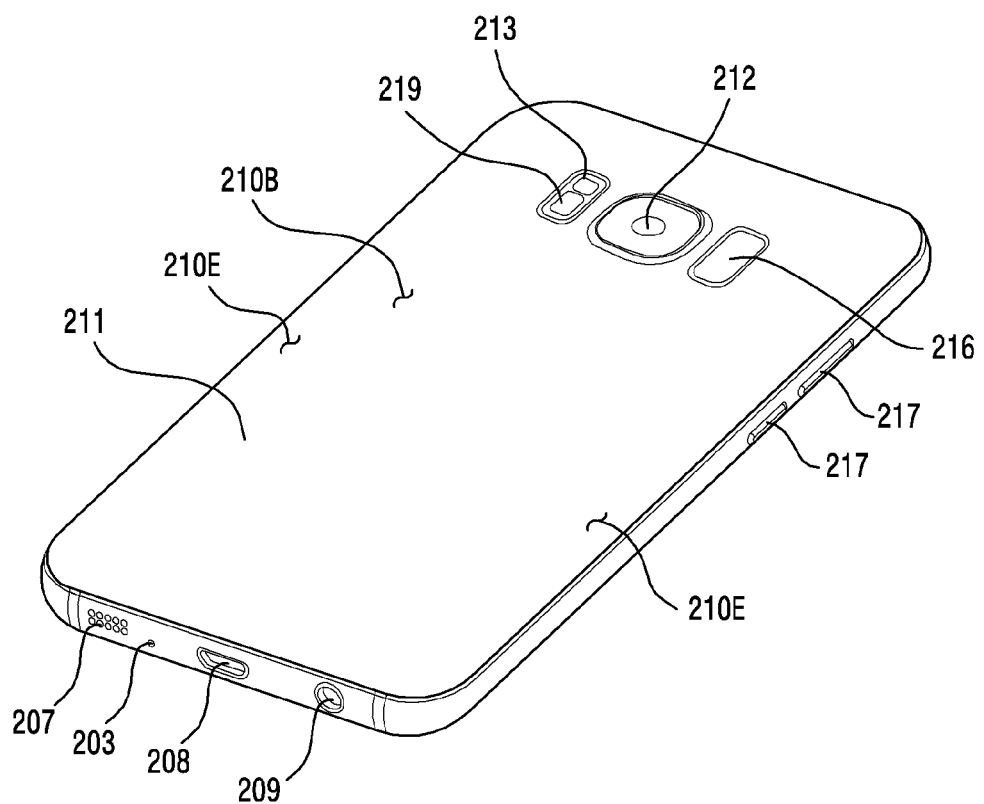
FIG. 2B is a perspective view of a rear surface of the electronic device of FIG. 2A according to various embodiments of the disclosure.

FIG. 2A is a front side perspective view illustrating an electronic device 200 according to various embodiments. FIG. 2B is a rear side perspective view illustrating the electronic device 200 according to various embodiments.

Referring to FIGS. 2a and 2b, the electronic device 200 according to an embodiment may include a housing 210 including a first face (or a front face) 210A, a second face (or a rear face) 210B, and a side face 210C surrounding the space between the first face 210A and the second face 210B. In another embodiment (not illustrated), the term "housing" may refer to a structure forming some of the first face 210A, the second face 210B, and the side face 210C of FIG. 2A. According to an embodiment, at least a portion of the first face 210A may be formed of a substantially transparent front plate 202 (e.g., a glass plate or a polymer plate including various coating layers). The second face 210B may be formed by a substantially opaque rear plate 211. The rear plate 211 may be formed of, for example, coated or colored glass, ceramic, polymer, or metal (e.g., aluminum, stainless steel (STS), or magnesium), or a combination of two or more of these materials. The side face 210C may be formed by a side bezel structure 218 (or a "side member") coupled to the front plate 202 and the rear plate 211 and including a metal and/or a polymer. In some embodiments, the rear plate 211 and the side bezel structure 218 may be integrally formed, and may include the same material (e.g., a metal material such as aluminum).

In the illustrated embodiment, the front plate 202 may include, at the long opposite side edges thereof, two first areas 210D, which are bent from the first face 210A towards the rear plate 211 and extend seamlessly. In the illustrated embodiment (see FIG. 2B), the rear plate 211 may include, at the long opposite side edges thereof, two second areas 210E, which are bent from the second face 210B towards the front plate 202 and extend seamlessly. In some embodiments, the front plate 202 (or the rear plate 211) may include only one of the first areas 210D (or the second areas 210E). In another embodiment, some of the first areas 210D and the second areas 210E may not be included. In the embodiments described above, when viewed from a side of the electronic device 200, the side bezel structure 218 may have a first thickness (or width) on the side faces, which do not include the first areas 210D or the second areas 210E, and may have a second thickness (or width), which is smaller than the first thickness, on the side faces, which include the first areas 210D or the second areas 210E.

According to an embodiment, the electronic device 200 may include at least one of a display 201, audio modules 203, 207, and 214, sensor modules 204, 216, and 219, camera modules 205, 212, and 313, key input devices 217, light-emitting elements 206, and connector holes 208 and 209. In some embodiments, at least one of the components (e.g., the key input devices 217 or the light-emitting elements 206) may be omitted from the electronic device 200, or the electronic device 200 may additionally include other components.

According to an embodiment, the display 201 may be exposed through a large portion of, for example, the front plate 202. In some embodiments, at least a portion of the display 201 may be exposed through the front plate 202 forming the first face 210A and the first areas 210D of the side faces 210C. In some embodiments, the edges of the display 201 may be formed to be substantially the same as the shape of the periphery of the front plate 202 adjacent thereto. In another embodiment (not illustrated), the distance between the periphery of the display 201 and the periphery of the front plate 202 may be substantially constant in order to enlarge the exposed area of the display 201.

In another embodiment (not illustrated), a recess or an opening may be formed in a portion of the screen display area of the display 201, and at least one of the audio module 214, the sensor module 204, the camera module 205, and the light-emitting elements 206 may be aligned with the recess or the opening. In another embodiment (not illustrated), the rear face of the screen display area of the display 201 may include at least one of the audio module 214, the sensor module 204, the camera module 205, the fingerprint sensor 216, and the light-emitting elements 206. In another embodiment (not illustrated), the display 201 may be coupled to or disposed adjacent to a touch-sensitive circuit, a pressure sensor that is capable of measuring a touch intensity (pressure), and/or a digitizer that detects a magnetic-field-type stylus pen. In some embodiments, at least some of the sensor modules 204 and 519 and/or at least some of the key input devices 217 may be disposed in the first areas 210D and/or the second areas 210E.

According to an embodiment, the audio modules 203, 207, and 214 may include a microphone hole 203 and speaker holes 207 and 214. The microphone hole 203 may include a microphone disposed therein so as to acquire external sound, and in some embodiments, multiple microphones may be disposed therein so as to detect the direction of sound. The speaker holes 207 and 214 may include an external speaker hole 207 and a phone call receiver hole 214. In some embodiments, the speaker holes 207 and 214 and the microphone hole 203 may be implemented as a single hole, or a speaker may be included without the speaker holes 207 and 214 (e.g., a piezo speaker).

According to an embodiment, the sensor modules 204, 216, and 219 may generate an electrical signal or a data value corresponding to the internal operating state or the external environmental state of the electronic device 200. The sensor modules 204, 216, and 219 may include, for example, a first sensor module 204 (e.g., a proximity sensor), a second sensor module (not illustrated) (e.g., a fingerprint sensor) disposed on the first face 210A of the housing 210, a third sensor module 219 (e.g., an HRM sensor), and/or a fourth sensor module 216 (e.g., a finger print sensor) disposed on the second face 210B of the housing 210. The fingerprint sensor may be disposed not only on the first face 210A of the housing 210 (e.g., the display 201), but also on the second face 210B. The electronic device 200 may further include at least one of sensor modules (not illustrated) such as a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

According to an embodiment, the camera modules 205, 212, and 313 may include, for example, a first camera device 205 disposed on the first face 210A of the electronic device 200 and a second camera device 212 and/or a flash 313 disposed on the second face 210B of the electronic device 200. The camera modules 205 and 212 may include one or more lenses, an image sensor, and/or an image signal processor. The flash 313 may include, for example, a light emitting diode or a xenon lamp. In some embodiments, two or more lenses (e.g., an infrared camera lens, a wide-angle lens, and a telephoto lens) and image sensors may be disposed on one face of the electronic device 200.

According to an embodiment, the key input devices 217 may be disposed on the side face 210C of the housing 210. In another embodiment, the electronic device 200 may not include some or all of the above-mentioned key input devices 217, and a key input device 217, which is not included in the electronic device 100, may be implemented in another form, such as that of a soft key or the like, on the display 201. In some embodiments, the key input devices may include a sensor module 216 disposed on the second face 210B of the housing 210.

According to an embodiment, the light-emitting element 206 may be disposed on, for example, the first face 210A of the housing 210. The light-emitting element 206 may provide, for example, information about the state of the electronic device 200 in an optical form. In another embodiment, the light-emitting element 206 may provide a light source that is interlocked with, for example, the operation of the camera module 205. The light-emitting element 206 may include, for example, an LED, an IR LED, and a xenon lamp.

The connector holes 208 and 209 may include a first connector hole 208 that is capable of accommodating a connector (e.g., a USB connector) for transmitting and receiving power and/or data to and from an external electronic device, and/or a second connector hole 209 that is capable of receiving a connector (e.g., an earphone jack) for transmitting and receiving an audio signal to and from an electronic device.

Figure 2C:
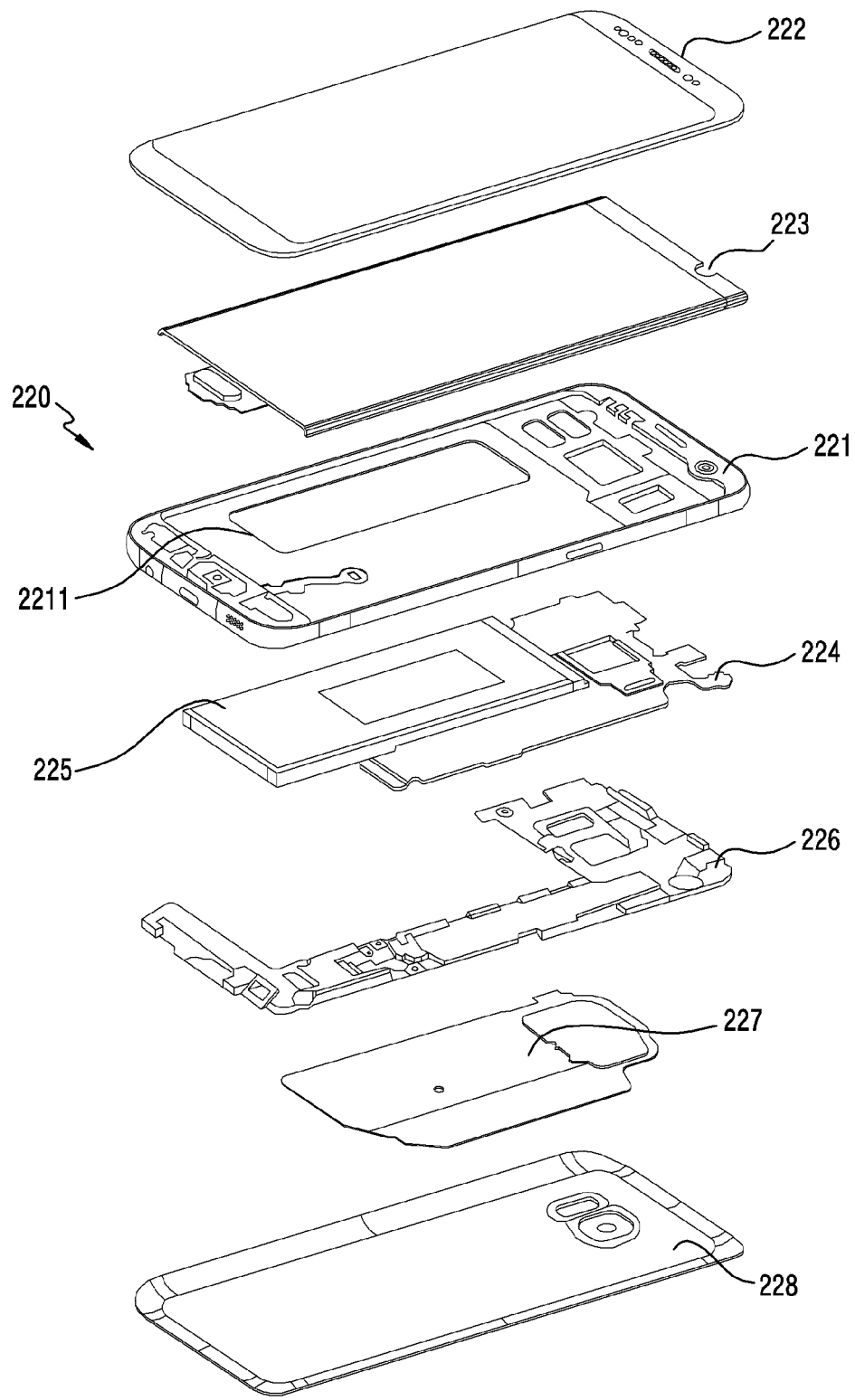
FIG. 2C is an exploded perspective view of the electronic device according to various embodiments of the disclosure.

FIG. 2C is an exploded perspective view of the mobile electronic device of FIG. 2A (for example, the mobile electronic device 200 of FIG. 2A) according to various embodiments of the disclosure.

Referring to FIG. 2C, the mobile electronic device 220 may include a side surface bezel structure 221, a first support member 2211 (for example, a bracket, an intermediate plate), a front surface plate 222, a display 223, a printed circuit board 224 (for example, a first printed circuit board), a battery 225, a second support member 226 (for example, a rear case), an antenna 227, and a rear surface plate 228. In a certain embodiment, the electronic device 220 may omit at least one (for example, the first support member 2211 or the second support member 226) of the components, or may additionally include other components. At least one of the components of the electronic device 220 may be the same as or similar to at least one of the components of the electronic device 200 of FIG. 2A or 2B, and a redundant explanation will be omitted hereinbelow.

The first support member 2211 may be disposed in the electronic device 220 and may be connected with the side surface bezel structure 221, or may be integrally formed with the side surface bezel structure 221. The first support member 2211 may be formed by, for example, a metallic material and/or a nonmetallic material (for example, a polymer). The first support member 2211 may have one surface coupled to the display 223 and the other surface coupled to the printed circuit board 224. The printed circuit board 224 may have a processor, a memory, and/or an interface mounted thereon. The processor may include one or more of, for example, a central processing device, an application processor, a graphic processing device, an image signal processor, a sensor hub processor, or a communication processor.

The memory may include, for example, a volatile memory or a nonvolatile memory.

The interface may include, for example, a high definition multimedia interface (HDMI), a universal serial bus (USB) interface, a secure digital (SD) card interface, and/or an audio interface. The interface may electrically or physically connect the electronic device 220 to an external electronic device, and may include a USB connector, an SD card/ multimedia card (MMC) connector, or an audio connector.

The battery 225 is a device for supplying power to at least one component of the electronic device 220, and for example, may include a primary battery that is not rechargeable, a rechargeable secondary battery, or a fuel cell. At least a portion of the battery 225 may be disposed on substantially the same plane as the printed circuit board 224. The battery 210 may be integrally disposed in the electronic device 220, or may be disposed to be attachable to and detachable from the electronic device 101.

The antenna 227 may be disposed between the rear surface plate 228 and the battery 225. The antenna 227 may include, for example, a near field communication (NFC) antenna, a wireless charging antenna, and/or a magnetic secure transmission (MST) antenna. The antenna 227 may remotely communicate with an external device or may wirelessly transmit and receive power necessary for charging. In another embodiment, an antenna structure may be formed by a portion or a combination of the side surface bezel structure 221 and/or the first support member 2211.

Figure 3:
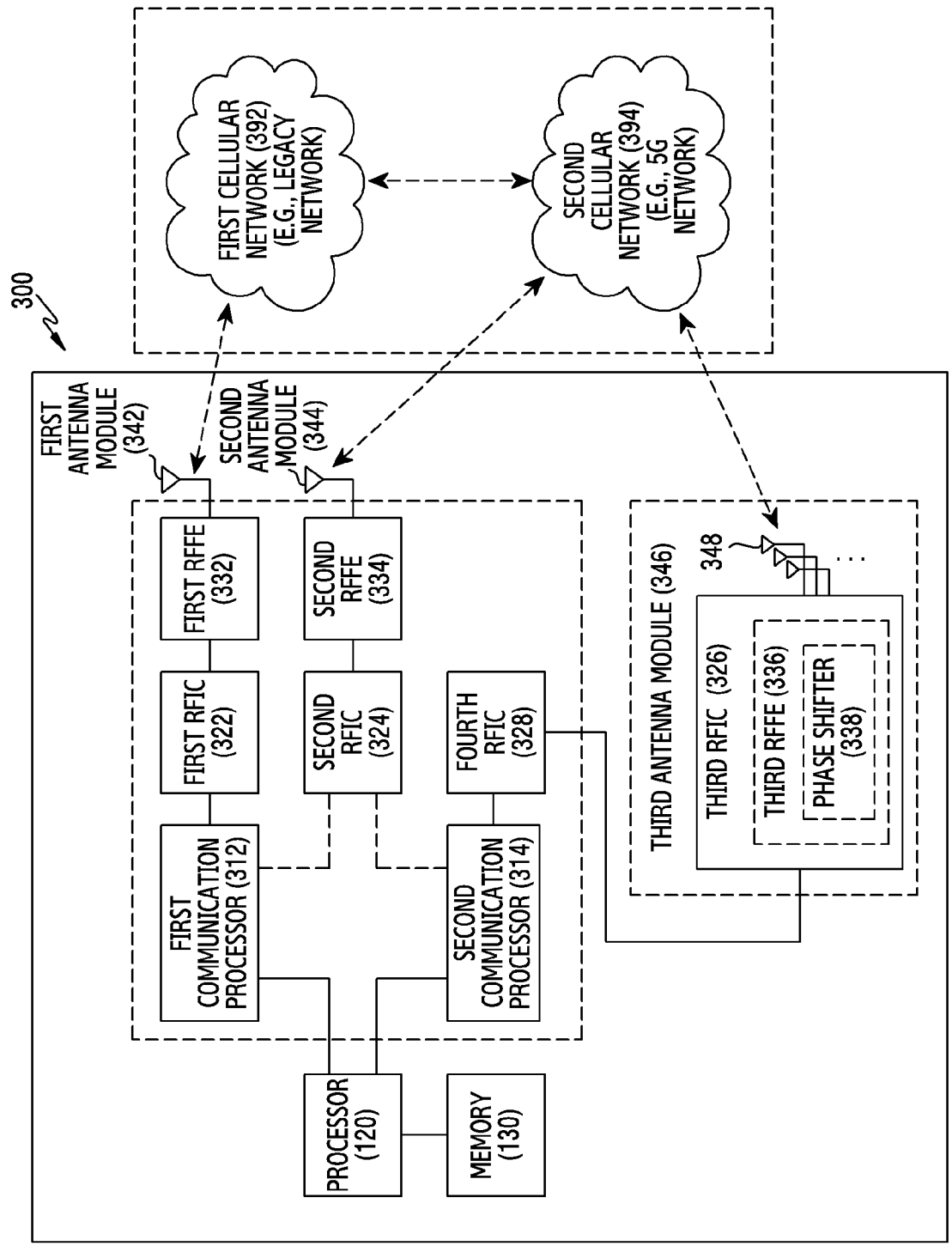
FIG. 3 is a block diagram of an electronic device in a network environment including a plurality of cellular networks according to various embodiments.

FIG. 3 is a block diagram 300 of an electronic device 101 in a network environment including a plurality of cellular networks according to various embodiments. Referring to FIG. 3, the electronic device 101 may include a first communication processor 312, a second communication processor 314, a first radio frequency integrated circuit (RFIC) 322, a second RFIC 324, a third RFIC 326, a fourth RFIC 328, a first radio frequency front end (RFFE) 332, a second RFFE 224, a first antenna module 342, a second antenna module 344, and an antenna 348. The electronic device 101 may further include a processor 120 and a memory 130. A second network 199 may include a first cellular network 392 and a second cellular network 394. According to another embodiment, the electronic device 101 may further include at least one component of the components described in FIG. 1, and the second network 199 may further include at least one other network. According to an embodiment, the first communication processor 312, the second communication processor 314, the first RFIC 322, the second RFIC 324, the fourth RFIC 328, the first RFFE 332, and the second RFFE 334 may form at least a portion of a wireless communication module 192. According to another embodiment, the fourth RFIC 328 may be omitted or may be included as a portion of the third RFIC 326.

The first communication processor 312 may establish a communication channel of a band to be used for wireless communication with the first cellular network 392, and may support legacy network communication through the established communication channel. According to various embodiments, the first cellular network may be a legacy network that includes a second generation (2G), 3G, 4G, or long-term evolution (LTE) network. The second communication processor 314 may establish a communication channel corresponding to a designated band (for example, about 6 GHz to about 60 GHz) from among bands to be used for wireless communication with the second cellular network 394, and may support 5G network communication through the established communication channel. According to various embodiments, the second cellular network 394 may be a 5G network defined by $3^{rd}$ generation partnership project (3GPP). Additionally, according to an embodiment, the first communication processor 312 or the second communication processor 314 may establish a communication channel corresponding to another designated band (for example, about 6 GHz or less) from among the bands to be used for wireless communication with the second cellular network 394, and may support 5G network communication through the established communication channel. According to an embodiment, the first communication processor 312 and the second communication processor 314 may be implemented within a single chip or a single package. According to various embodiments, the first communication processor 312 or the second communication processor 314 may be formed within a single chip or a single package along with the processor 120, an auxiliary processor 123, or a communication module 190. According to an embodiment, the first communication processor 312 and the second communication processor 314 may be directly or indirectly connected with each other by an interface (not shown) to provide or receive data or a control signal unidirectionally or bidirectionally.

When transmitting signals, the first RFIC 322 may convert a baseband signal generated by the first communication processor 312 into a radio frequency (RF) signal of about 700 MHz to about 3 GHz to be used in the first cellular network 392 (for example, a legacy network). When an RF signal is received, the RF signal may be acquired from the first cellular network 392 (for example, a legacy network) through an antenna (for example, the first antenna module 342), and may be pre-processed through an RFFE (for example, the first RFFE 332). The first RFIC 322 may convert the pre-processed RF signal into a baseband signal to be processed by the first communication processor 312.

When transmitting signals, the second RFIC 324 may convert a baseband signal generated by the first communication processor 312 or the second communication processor 314 into an RF signal (hereinafter, a 5G Sub6 RF signal) of a Sub6 band (for example, about 6 GHz or less) to be used in the second cellular network 394 (for example, a 5G network). When a 5G Sub6 RF signal is received, the 5G Sub6 RF signal may be acquired from the second cellular network 394 (for example, a 5G network) through an antenna (for example, the second antenna module 344), and may be pre-processed through am RFFE (for example, the second RFFE 334). The second RFIC 324 may convert the pre-pressed 5G Sub6 RF signal into a baseband signal to be processed by a corresponding communication processor of the first communication processor 312 or the second communication processor 314.

The third RFIC 326 may convert a baseband signal generated by the second communication processor 314 into an RF signal (hereinafter, a 5G Above6 RF signal) of a 5G Above6 band (for example, about 6 GHz to about 60 GHz) to be used in the second cellular network 394 (for example, a 5G network). When a 5G Above6 RF signal is received, the 5G Above6 RF signal may be acquired from the second cellular network 394 (for example, a 5G network) through an antenna (for example, the antenna 348), and may be pre-processed through a third RFFE 336. The third RFIC 326 may convert the pre-processed 5G Above6 RF signal into a baseband signal to be processed by the second communication processor 314. According to an embodiment, the third RFFE 336 may be formed as a portion of the third RFIC 326.

According to an embodiment, the electronic device 101 may include the fourth RFIC 328 independently from the third RFIC 326 or as at least a portion thereof. In this case, the fourth RFIC 328 may convert a baseband signal generated by the second communication processor 314 into an RF signal of an intermediate frequency band (for example, about 9 GHz to about 11 GHz) (hereinafter, an IF signal), and then may transmit the IF signal to the third RFIC 326. The third RFIC 326 may convert the IF signal into a 5G Above6 RF signal. When a 5G Above6 RF signal is received, the 5G Above6 RF signal may be received from the second cellular network 394 (for example, a 5G network) through an antenna (for example, the antenna 348), and may be converted into an IF signal by the third RFIC 326. The fourth RFIC 328 may convert the IF signal into a baseband signal to be processed by the second communication processor 314.

According to an embodiment, the first RFIC 322 and the second RFIC 324 may be implemented as at least a portion of a single chip or a single package. According to an embodiment, the first RFFE 322 and the second RFFE 334 may be implemented as at least a portion of a single chip or a single package. According to an embodiment, at least one antenna module of the first antenna module 342 or the second antenna module 344 may be omitted or may be coupled with another antenna module to process RF signals of a plurality of corresponding bands.

According to an embodiment, the third RFIC 326 and the antenna 348 may be disposed on the same substrate to form the third antenna module 346. For example, the wireless communication module 192 or the processor 120 may be disposed on a first substrate (for example, a main PCB). In this case, the third RFIC 326 may be disposed on some area (for example, a lower surface) of a second substrate (for example, a sub PCB) separate from the first substrate, and the antenna 348 may be disposed on the other some area (for example, an upper surface), such that the third antenna module 346 is formed. The third RFIC 326 and the antenna 348 are disposed on the same substrate, so that a length of a transmission line therebetween can be reduced. For example, this can prevent a signal of a high frequency band (for example, about 6 GHz to about 60 GHz) used in 5G network communication from being lost (for example, from attenuating) by the transmission line. Accordingly, the electronic device 101 can enhance quality or speed of communication with the second cellular network 394 (for example, a 5G network).

According to an embodiment, the antenna 348 may be formed with an antenna array including a plurality of antenna elements which may be used for beamforming. In this case, the third RFIC 326 may include, as a portion of the third RFFE 336, a plurality of phase shifters 338 corresponding to the plurality of antenna elements. When transmitting signals, each of the plurality of phase shifters 338 may convert a phase of a 5G Above6 RF signal to be transmitted to the outside (for example, a base station of a 5G network) of the electronic device 101 through a corresponding antenna element. When receiving signals, each of the plurality of phase shifters 338 may convert a phase of a 5G Above6 RF signal received from the outside through a corresponding antenna element into the same or substantially the same phase. This may make it possible to transmit or receive signals through beamforming between the electronic device 101 and the outside.

The second cellular network 394 (for example, a 5G network) may operate independently from the first cellular network 392 (for example, a legacy network) (for example, stand-alone (SA)), or may operate in connection therewith (for example, non-stand alone (NSA)). For example, the 5G network may include only an access network (for example, a 5G radio access network (RAN) or a next generation RAN (NG RAN)), and may not include a core network (for example, a next generation core (NGC)). In this case, the electronic device 101 may access the access network of the 5G network, and then, may access an external network (for example, Internet) under control the core network (for example, an evolved packed core (EPC)) of the legacy network. Protocol information (for example, LTE protocol information) for communication with the legacy network or protocol information (for example, new radio (NR) protocol information) for communication with the 5G network may be stored in a memory 330, and may be accessed by other components (for example, the processor 120, the first communication processor 312, or the second communication processor 314).

Figure 4A:
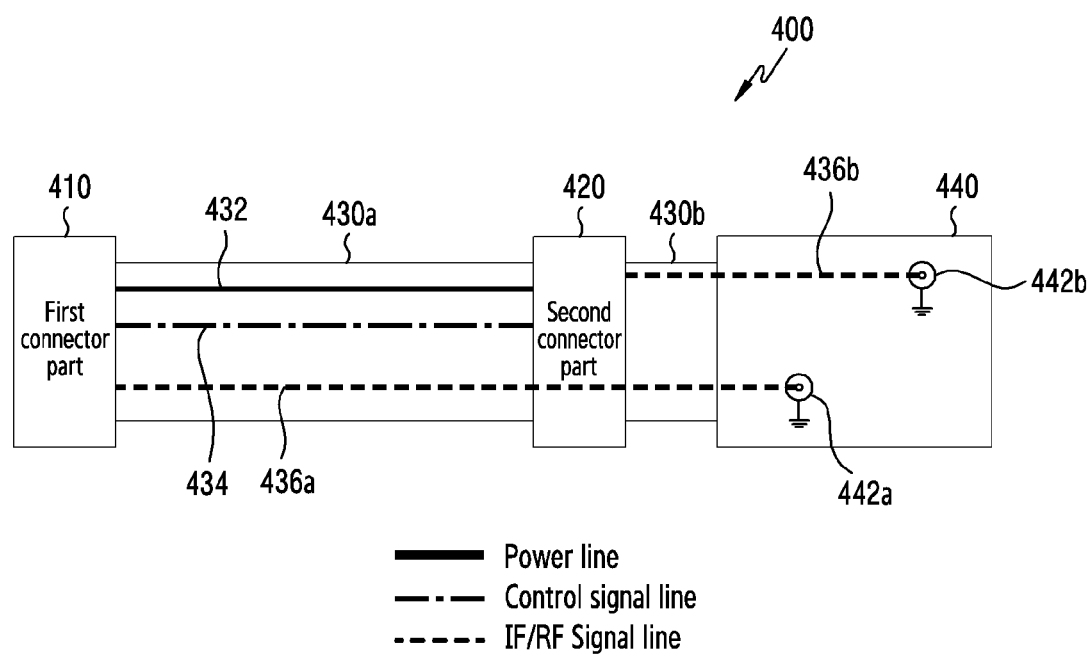
FIGS. 4A, 4B, and 4C are views illustrating a configuration of a wiring device for connecting between modules according to various embodiments of the disclosure.
Figure 4B:
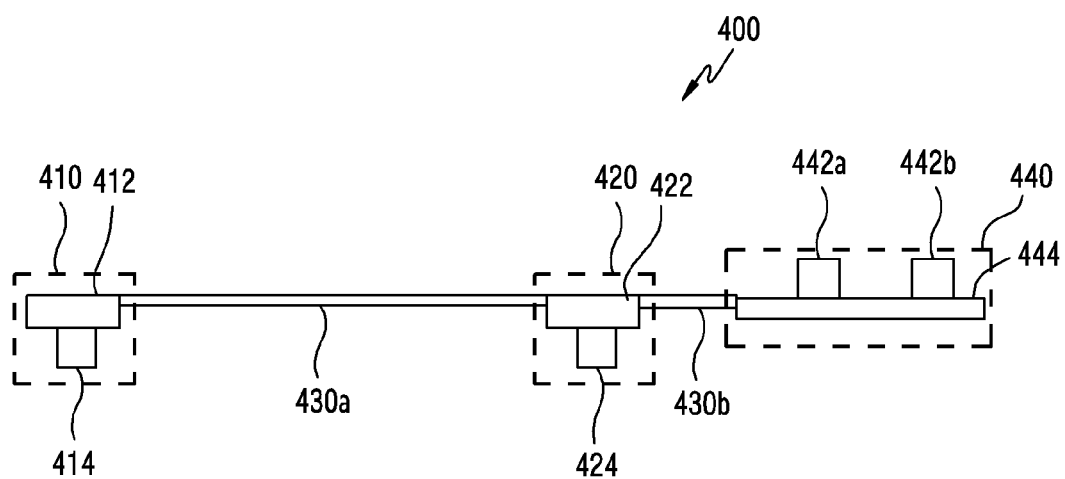
Figure 4C:
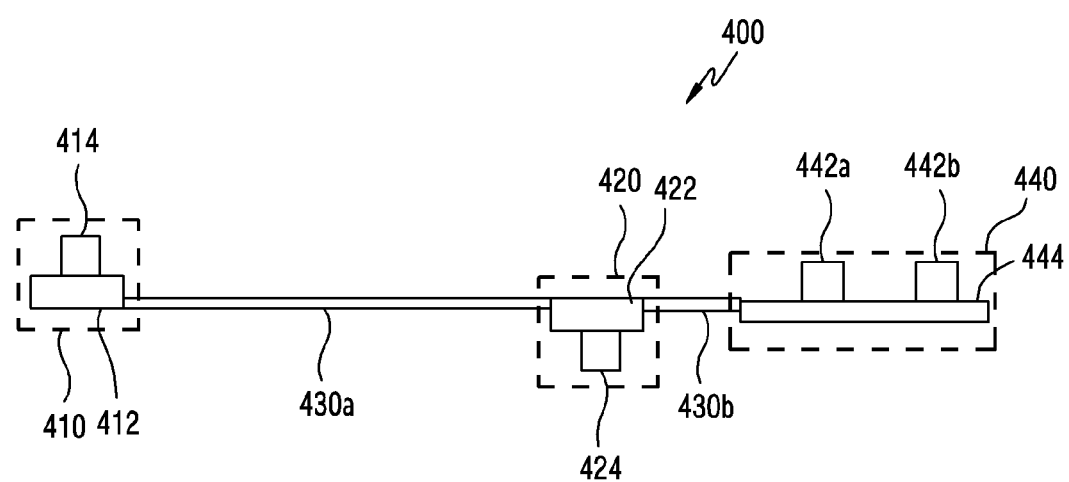

FIGS. 4A, 4B, and 4C illustrate a configuration of a wiring device 400 for connecting between modules according to various embodiments of the disclosure. FIG. 4A is a top view of the wiring device 400, FIG. 4B is a view of one side surface according to an embodiment, and FIG. 4C is a view of one side surface according to another embodiment.

Referring to FIGS. 4A and 4B, the wiring device 400 may include at least one of a first connector part 410, a second connector part 420, a first line part 430a, a second line part 430b, or an external device connection part 440.

The first connector part 410 may be a component for connecting to a connector of a first module of the first module and a second module which are connected with each other through the wiring device 400, and the second connector part 420 may be a component for connecting to a connector of the second module of the first module and the second module connected with each other through the wiring device 400.

The first connector part 410 may include a first substrate 412 of a rigid material which has less flexibility, and a first connector 414 disposed on the first substrate 412. The second connector part 420 may include a second substrate 422 of a rigid material which has less flexibility, and a second connector 424 disposed on the second substrate 422. The first substrate 412 and the second substrate 422 may include a conductive pattern for connecting the first connector 414 and the second connector 424 and lines in the first line part 430*a*. The first connector 414 and the second connector 424 may protrude from the first connector part 410 and the second connector part 420 in a direction perpendicular to a direction in which the first line part 430*a* is disposed. The first connector 414 and the second connector 424 may have structures to be fastened to connectors of modules connected through the wiring device 400. For example, the first connector 414 and the second connector 424 may include shells having a rectangular shape, a circular shape, an oval shape, or a combination thereof, and may have at least one port disposed on an inner surface or an outer surface of the shell and connected with at least one line included in the first line part 430*a*. The first connector 414 and the second connector 424 may include a locking member (not shown) or a locking groove (not shown) for tightly fastening with the connectors of the modules.

In the example of FIG. 4B, the first connector 414 and the second connector 424 may protrude downwardly in the same way. According to another embodiment, as shown in FIG. 4C, the first connector 414 and the second connector 424 may protrude in different directions, for example, the first connector 414 protruding in an upward direction, the second connector 424 protruding in a downward direction. The protruding directions of the first connector 414 and the second connector 424 may vary according to positions of the connected modules and positions and shapes of the connectors of the modules. The first connector 414 and the second connector 424 may connect a plurality of lines between the plurality of modules.

The first line part 430*a* may be a set of lines disposed between the first connector part 410 and the second connector part 420, and members for supporting the lines. The first line part 430*a* may include a portion of a power line 432, a control signal line 434, and a first IF/RF signal line 436*a*. The first line part 430*a* may further include a structure (for example, a copper foil) for shielding between the lines 432, 434, 436*a*, an insulator cover enclosing the lines, a ground line, a structure for connecting with a connector (for example, the first connector part 410 and the second connector part 420), in addition to the lines 432, 434, 436*a*.

The second line part 430*b* may be a set of lines disposed between the second connector 420 and the external device connection part 440, and members for supporting the lines. The second line part 430*b* may include the other portion of the first IF/RF signal line 436*a*, and a second IF/RF signal line 436*b*. The second line part 430*b* may further include a structure (for example, a copper foil) for shielding between the lines 436*a*, 436*b*, an insulator cover enclosing the lines, a ground line, a structure for connecting with the second connector part 420, a structure for connecting with the external device connection part 440, in addition to the lines 436*a*, 436*b*.

The external device connection part 440 may be a component for connecting an external device (for example, a measurement device). The external device connection part 440 may include at least one port (for example, a first port 442*a* or a second port 442*b*). The external device connection part 440 may further include a circuit board 444 to support the first port 442*a* and the second port 442*b*. Each of the first port 442*a* and the second port 442*b* may be a structure for fastening a cable to connect with the external device. The first port 442*a* may be connected with the first IF/RF signal line 436*a* connected with the first connector part 410, and the second port 442*b* may be connected with the second IF/RF signal line 436*b* connected with the second connector part 420. The first IF/RF signal line 436*a* and the second IF/RF signal line 436*b* may be separate by the first port 442*a* and the second port 442*b* such that the first IF/RF signal line 436*a* and the second IF/RF signal line 436*b* are not connected with each other. Since the external device connection part 440 has a structure extended from the second connector part 420, the external device connection part may be referred to as an "extension part".

In the example of FIGS. 4A, 4B, and 4C, it is illustrated that the external device connection part 440 includes two ports (for example, the first port 442*a* and the second port 442*b*), but according to another embodiment, one or three or more ports may be included in the external device connection part 440. In addition, in the example of FIGS. 4A and 4B, it is illustrated that the two ports (for example, the first port 442*a* and the second port 442*b*) are disposed on an upper surface of the external device connection part 440, but according to another embodiment, at least one of the ports may be disposed the other side surface (for example, a lower surface).

Figure 5A:
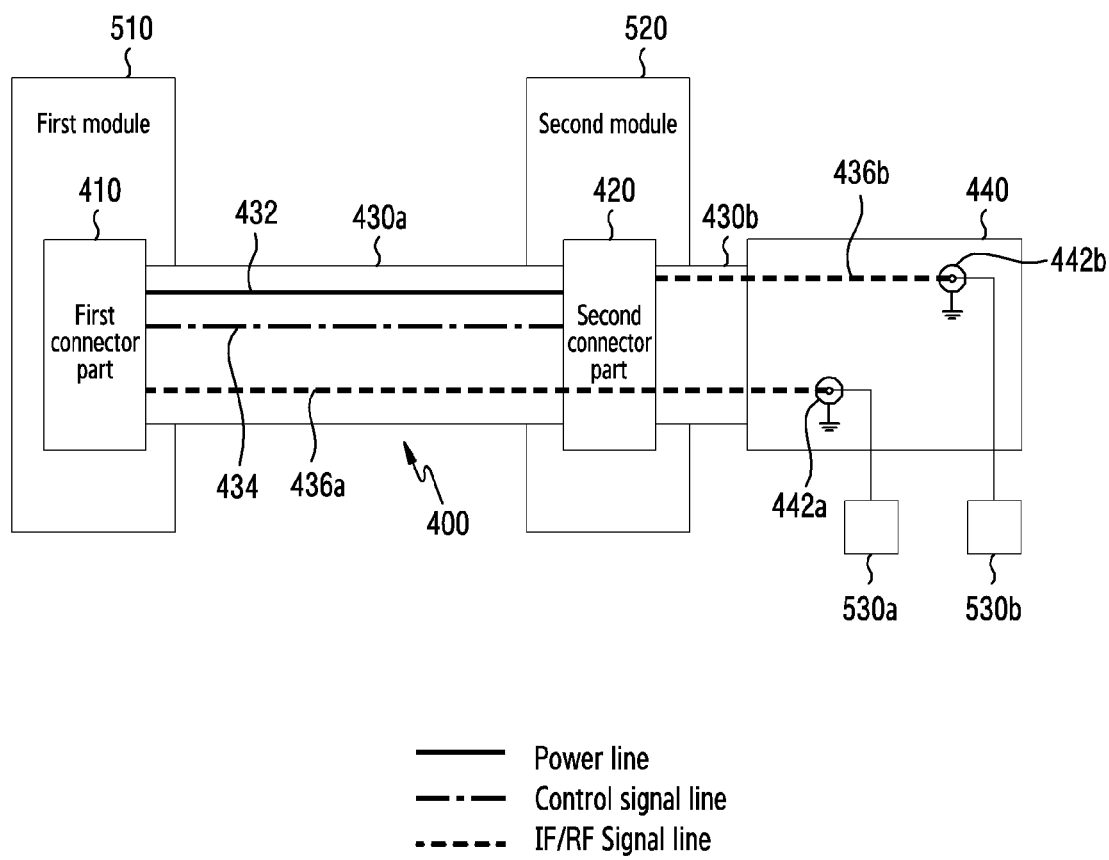
FIGS. 5A and 5B are view illustrating examples of a use state of the wiring device for connecting between modules according to various embodiments of the disclosure.
Figure 5B:
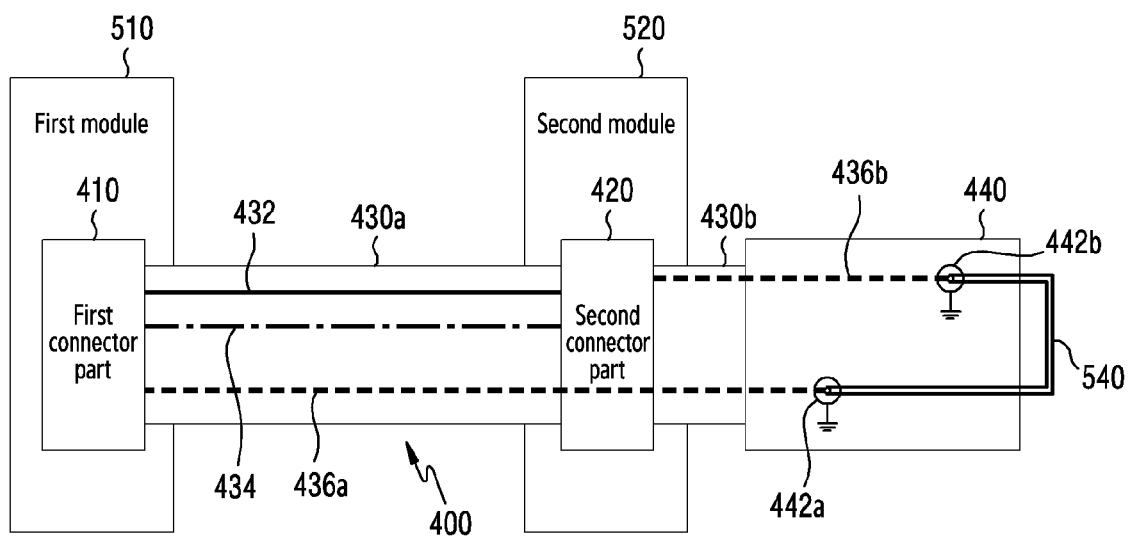

FIGS. 5A and 5B illustrate examples of a use state of the wiring device 400 for connecting between modules according to various embodiments of the disclosure. FIG. 5A illustrates an example of a state in which the wiring device is connected with a device for testing, and FIG. 5B illustrates an example of a state in which connected modules can normally operate.

Referring to FIG. 5A, the wiring device 400 may be connected with a first module 510 (for example, the third antenna module 346) through the first connector part 410, and may be connected with a second module 520 (for example, the wireless communication module 192) through the second connector part 420. Through the power line 432 and the control signal line 434, a power path and a control signal path may be formed between the first module 510 and the second module 520. Since the IF/RF signal lines 436*a* and 436*b* are not connected with each other and are connected with external measurement devices 530*a* and 530*b*, an IF/RF signal path may not be formed between the first module 510 and the second module 520. The external measurement devices 530*a* and 530*b* may be devices for testing or optimizing the first module 510 or the second module 520, and may generate a signal to be transmitted to the first module 510 or the second module 520 or may measure a signal transmitted from the first module 510 or the second module 520.

Referring to FIG. 5B, the wiring device 400 may be connected with the first module 510 through the first connector part 410, and may be connected with the second module 520 through the second connector part 420. Through the power line 432 and the control signal line 434, a power path and a control signal path may be formed between the first module 510 and the second module 520. Since the IF/RF signal lines 436*a* and 436*b* are connected with an external cable 540 by using the ports 442*a* and 442*b*, an IF/RF signal path may be formed between the first module 510 and the second module 520. In the case of FIG. 5B, since power, a control signal, an IF/RF signal can be transmitted, the first module 510 and the second module 520 can normally interwork with each other.

Figure 6A:
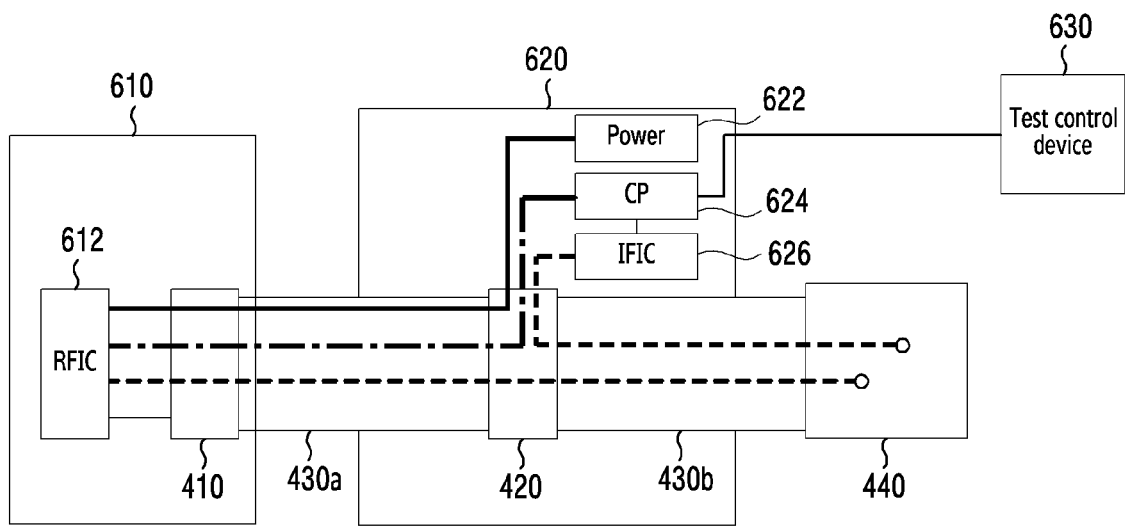
FIGS. 6A, 6B, and 6C are views illustrating examples of a state in which the wiring device connects modules for communication according to various embodiments of the disclosure.
Figure 6B:
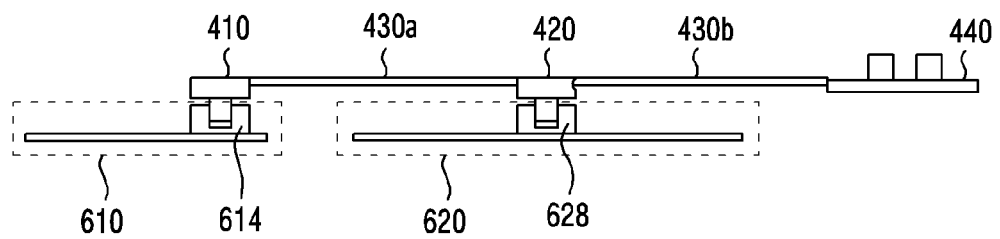
Figure 6C:
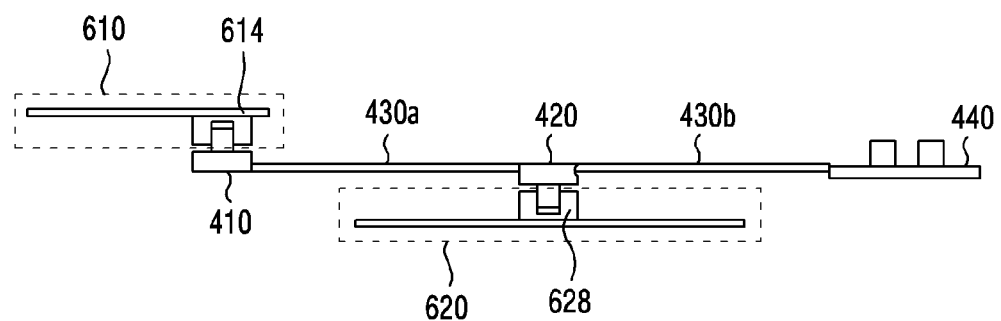

FIGS. 6A, 6B, and 6C illustrate examples of a state in which a wiring device connects modules for communication according to various embodiments of the disclosure. FIGS. 6A, 6B, and 6C illustrate examples of a state in which the wiring device 400 are connected with a first module 610 and a second module 620 for communication.

Referring to FIG. 6A, the first module 610 (for example, the third antenna module 346) may be a device for processing an RF signal, and may include an RF integrated circuit (RFIC) 612. In another example, the first module 610 may further include at least one antenna, and in this case, the first module 610 may be understood as the antenna module 360 of FIG. 3B. The wiring device 400 may be connected with the first module 610 through the first connector part 410. The first module 610 may include a connector 614 to be fastened to the first connector part 410.

The second module 620 (for example, the wireless communication module 192) may be a device for supplying power, controlling communication, and processing an IF signal, and may include a power supply part 622, a communication processor (CP) 624, an IF integrated circuit (IFIC) 626. The power supply part 622 may supply power to other components (for example, the CP 624, the IFIC 626, and the RFIC 612). The power supply part 622 may include at least one of a direct current (DC)-DC converter, a voltage regulator. The CP 624 may process a baseband signal, and the IFIC 626 may process an IF signal, and accordingly, the second module 620 may be understood as the wireless communication module 192. The wiring device 400 may be connected with the second module 620 through the second connector part 420. The second module 620 may include a connector 628 to be fastened to the second connector part 420.

A test control device 630 may be connected to the CP 624 of the second module 620 and may control the CP 624. The test control device 630 may control the CP 624 to perform operations for testing whether the first module 610 and the second module 620 operate in accordance with pre-defined requirements. For example, various tests such as a power test, a linearity test, a current test, etc. may be performed under control of the test control device 630. The CP 624 and the test control device 630 may be connected with each other through an interface such as a USB or a universal asynchronous receiver/transmitter (UART).

The wiring device 400 may be connected with the first module 610 and the second module 620. Connection directions of the first module 610 and the second module 620 may vary according to structures of the first connector part 410 and the second connector part 420 included in the wiring device 400. According to an embodiment, as shown in FIG. 6B, the first module 610 and the second module 620 may be connected with the wiring device 400 from bottom to top. According to another embodiment, as shown in FIG. 6C, the first module 610 may be connected with the wiring device 400 from top to bottom, and the second module 620 may be connected with the wiring device 400 from bottom to top.

Figure 7A:
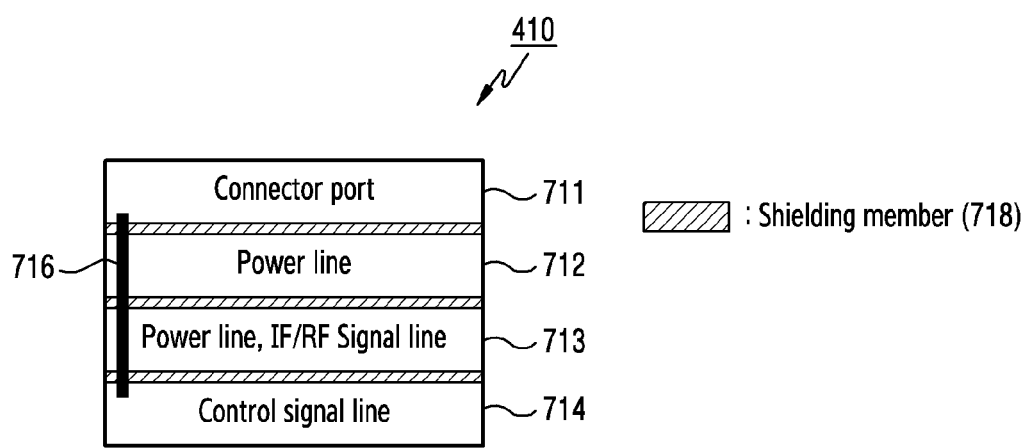
FIGS. 7A to 7E are views illustrating examples of a stacking structure of the wiring device for connecting between modules according to various embodiments.
Figure 7B:
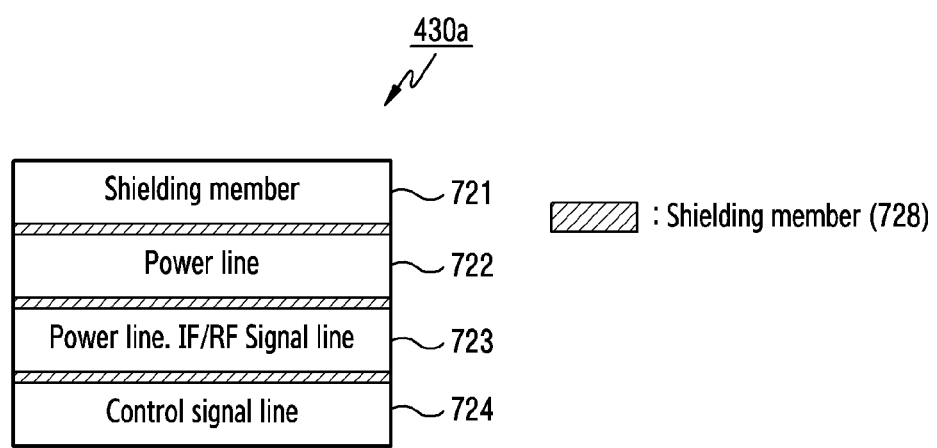
Figure 7C:
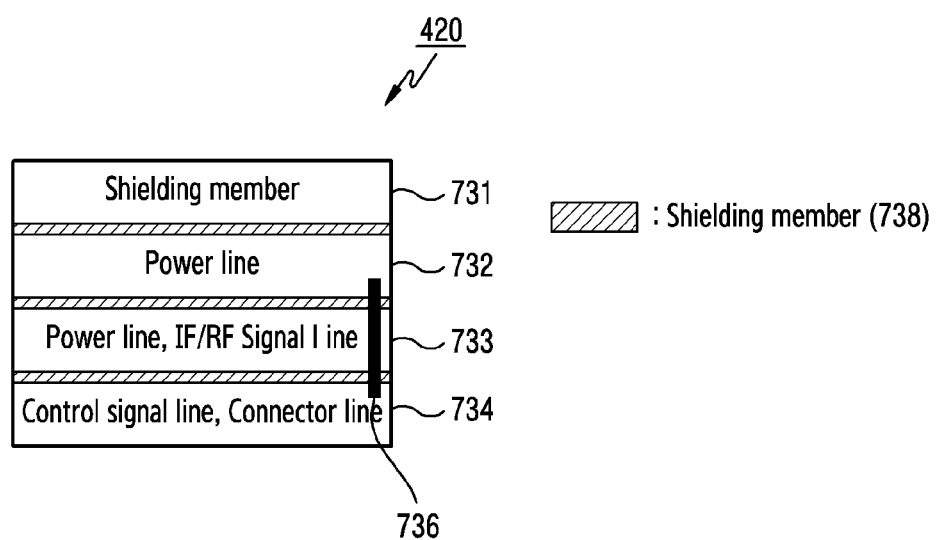
Figure 7D:
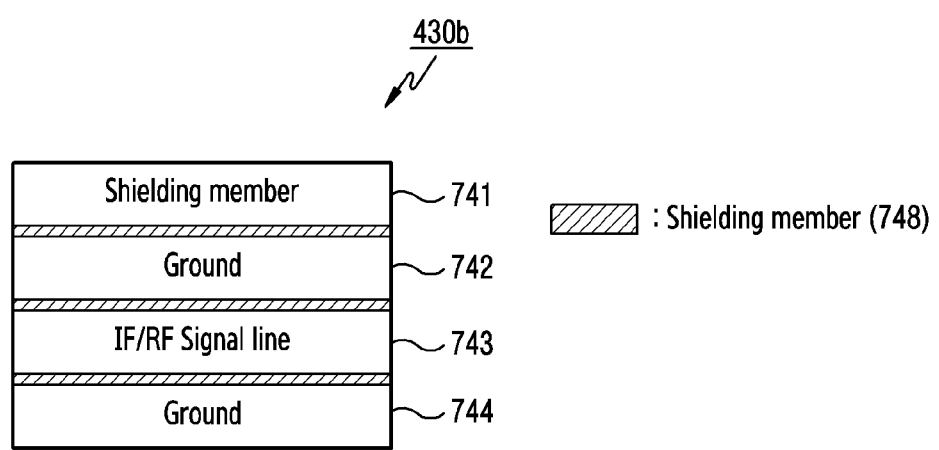
Figure 7E:
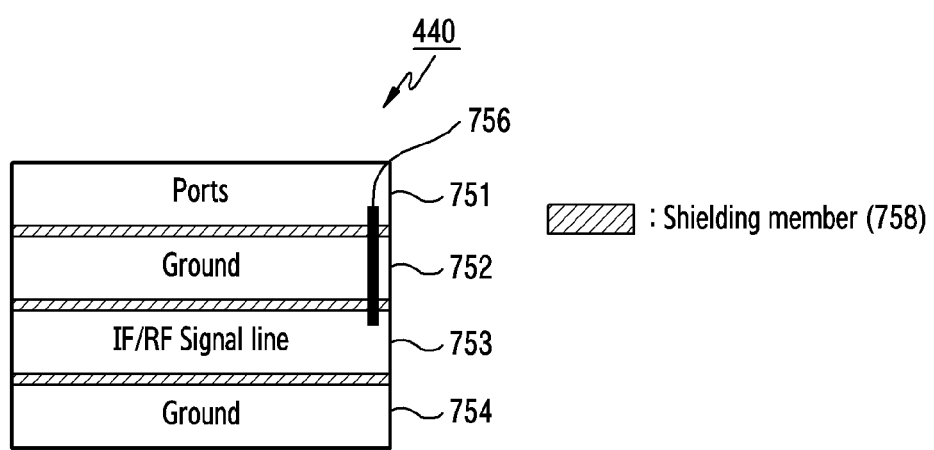

FIGS. 7A to 7E illustrate examples of a stacking structure of the wiring device 400 for connecting between modules according to various embodiments of the disclosure. FIG. 7A illustrates an example of a stacking structure of lines in the first connector part 410 of the wiring device 400, FIG. 7B illustrates an example of a stacking structure of the first line part 430a of the wiring device 400, FIG. 7C illustrates an example of a stacking structure of lines in the second connector part 420 of the wiring device 400, FIG. 7D illustrates an example of a stacking structure of the second line part 430b of the wiring device 400, and FIG. 7E illustrates an example of a stacking structure of lines in the external device connection part 440 of the wiring device 400.

Referring to FIG. 7A, the first connector part 410 of the wiring device 400 may include a first layer 711, a second layer 712, a third layer 713, and a fourth layer 714. The first layer 711 may have connector ports disposed therein, the second layer 712 may have a power line (for example, the power line 432) disposed therein, the third layer 713 may have a power line (for example, the power line 432) and an IF/RF signal line (for example, the first IF/RF signal line 436a) disposed therein, and the fourth layer 714 may have a control signal line (for example, the control signal line 434) disposed therein. The power line may be separately disposed in the second layer 712 and the third layer 713. A via 716 penetrating through the first layer 711, the second layer 712, the third layer 713, and the fourth layer 714 may be disposed, and the power line, the IF/RF signal line, the control signal line may be connected with the connector ports through the via 716. The first connector part 410 may further include a shielding member 718 to shield between the first layer 711, the second layer 712, the third layer 713, and the fourth layer 714. The shielding member 718 may be formed with a copper foil, and may be used as a ground.

Referring to FIG. 7B, the first line part 430a of the wiring device 400 may include a first layer 721, a second layer 722, a third layer 723, and a fourth layer 724. The first layer 721 may have a shielding member disposed therein, the second layer 722 may have a power line (for example, the power line 432) disposed therein, the third layer 723 may have a power line (for example, the power line 432) and an IF/RF signal line (for example, the first IF/RF signal line 436a) disposed therein, and the fourth layer 724 may have a control signal line (for example, the control signal line 434) disposed therein. The power line may be separately disposed in the second layer 722 and the third layer 723. The first line part 430a may further include a shielding member 728 to shield between the first layer 721, the second layer 722, the third layer 723, and the fourth layer 724. The shielding member 728 may be formed with a copper foil, and may be used as a ground.

Referring to FIG. 7C, the second connector part 420 of the wiring device 400 may include a first layer 731, a second layer 732, a third layer 733, and a fourth layer 744. The first layer 731 may have a shielding member disposed therein, the second layer 732 may have a power line (for example, the power line 432) disposed therein, the third layer 733 may have a power line (for example, the power line 432) and an IF/RF signal line (for example, the first IF/RF signal line 436a) disposed therein, and the fourth layer 734 may have a control signal line (for example, the control signal line 434) and connector ports disposed therein. The power line may be separately disposed in the second layer 732 and the third layer 733. A via 736 penetrating through the first layer 731, the second layer 732, the third layer 733, and the fourth layer 744 may be disposed, and the power line, the IF/RF signal line, the control signal line may be connected with the connector ports through the via 736. The second connector part 420 may further include a shielding member 738 to shield between the first layer 731, the second layer 732, the third layer 733, and the fourth layer 734. The shielding member 738 may be formed with a copper foil, and may be used as a ground.

Referring to FIG. 7D, the second line part 430b of the wiring device 400 may include a first layer 741, a second layer 742, a third layer 743, and a fourth layer 744. The first layer 741 may have a shielding member disposed therein, the second layer 742 may have a ground disposed therein, the third layer 743 may have an IF/RF signal line (for example, the first IF/RF signal line 436a and the second IF/RF signal line 436b) disposed therein, and the fourth layer 744 may have a ground disposed therein. The IF/RF signal line disposed in the third layer 743 may be a portion of the first IF/RF signal line 436a, and the second IF/RF signal line 436b, and the portion of the first IF/RF signal line 436a and the second IF/RF signal line 436b may be spaced apart from each other by a regular interval. Furthermore, a structure (for example, a via) (not shown) may further be included to shield between the portion of the first IF/RF signal line 436a and the second IF/RF signal line 436b. The second line part 430b may further include a shielding member 748 to shield between the first layer 741, the second layer 742, the third layer 743, and the fourth layer 744. The shielding member 748 may be formed with a copper foil, and may be used as a ground.

Referring to FIG. 7E, the external device connection part 440 of the wiring device 400 may include a first layer 751, a second layer 752, a third layer 753, and a fourth layer 754. The first layer 751 may have ports (for example, the first port 442a and the second port 442b) disposed therein, the second layer 752 may have a ground disposed therein, the third layer 753 may have an IF/RF signal line (for example, the first IF/RF signal line 436a and the second IF/RF signal line 436b) disposed therein, and the fourth layer 754 may have a ground disposed therein. The IF/RF signal line disposed in the third layer 753 may be a portion of the first IF/RF signal line 436a, and the second IF/RF signal line 436b, and the portion of the first IF/RF signal line 436a and the second IF/RF signal line 436b may be spaced apart from each other by a regular interval. Furthermore, a structure (for example, a via) (not shown) may further be included to shield between the portion of the first IF/RF signal line 436a and the second IF/RF signal line 436b. A via 756 penetrating through the first layer 751, the second layer 752, and the third layer 753 may be disposed, and the IF/RF signal line may be connected with the ports through the via 756. The external device connection part 440 may further include a shielding member 758 to shield between the first layer 751, the second layer 752, the third layer 753, and the fourth layer 754. The shielding member 758 may be formed with a copper foil, and may be used as a ground.

Figure 8:
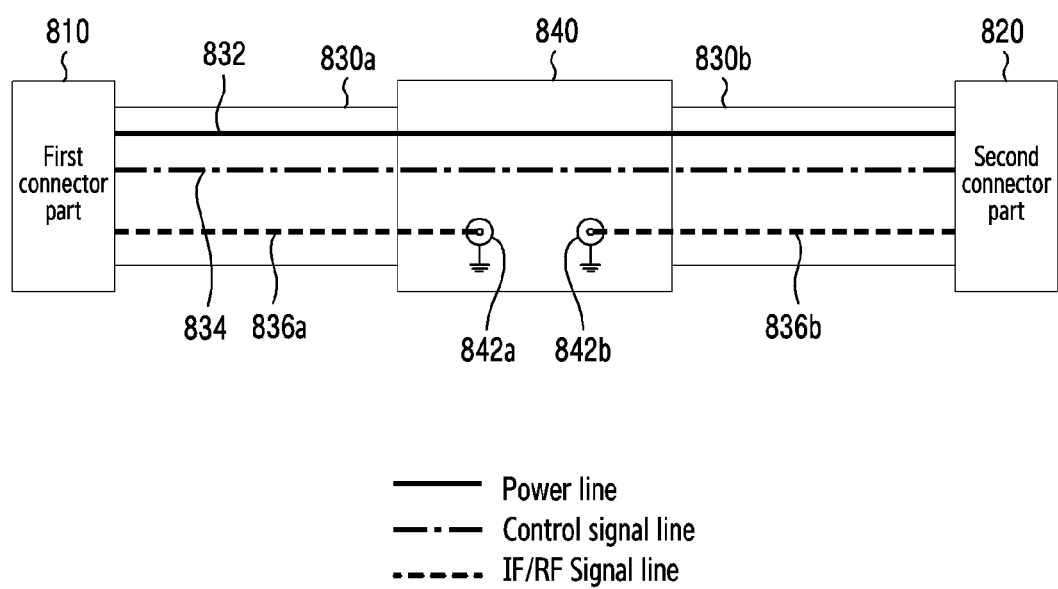
FIG. 8 is a view illustrating another configuration of a wiring device for connecting between modules according to various embodiments of the disclosure.

FIG. 8 illustrates another configuration of a wiring device 800 for connecting between modules according to various embodiments of the disclosure. FIG. 8 illustrates an example of a structure in which ports for connecting an external cable are disposed between connectors.

Referring to FIG. 8, the wiring device 800 may include at least one of a first connector part 810, a second connector part 820, a first line part 830a, a second line part 830b, or an external device connection part 840.

The first connector part 810 may be a component for connecting to a connector of a first module of the first module and a second module which are connected with each other through the wiring device 800, and the second connector part 820 may be a component for connecting to a connector of the second module of the first module and the second module connected with each other through the wiring device 800. The first connector part 810 may include a first substrate of a rigid material which has less flexibility, and a first connector disposed on the first substrate. The second connector part may include a second substrate of a rigid material which has less flexibility, and a second connector disposed on the second substrate.

The first line part 830a may be a set of lines disposed between the first connector part 810 and the external device connection part 840, and members for supporting the lines. The first line part 830a may include a power line 832, a control signal line 834, a first IF/RF signal line 836a. The first line part 830a may further include a structure (for example, a coil foil) for shielding between the lines 832, 834, 836a, an insulator cover enclosing the lines, a ground line, a structure for connecting with the first connector part 810, and a structure for connecting with the external device connection part 840, in addition to the lines 832, 834, 836a.

The second line part 830b may be a set of lines disposed between the external device connection part 840 and the second connector part 820, and members for supporting the lines. The second line part 830b may include the power line 832, the control signal line 834, a second IF/RF signal line 836b. The second line part 830b may further include a structure (for example, a coil foil) for shielding between the lines 832, 834, 836b, an insulator cover enclosing the lines, a ground line, a structure for connecting with the second connector part 820, and a structure for connecting with the external device connection part 840, in addition to the lines 832, 834, 836b.

The external device connection part 840 may be a component for connecting an external cable. The external device connection part 840 may include a first port 842a and a second port 842b. Each of the first port 842a and the second port 842b may be a structure for fastening an external cable. The first port 842a may be connected with the first IF/RF signal line 836a connected with the first connector part 810, and the second port 842b may be connected with the second IF/RF signal line 836b connected with the second connector part 820. The first IF/RF signal line 836a and the second IF/RF signal line 836b may be separated from each other by the first port 842a and the second port 842b, such that the first IF/RF signal line 836a and the second IF/RF signal line 836b are not connected with each other.

In the example of FIG. 8, it is illustrated that the external device connection part 840 includes two ports (for example, the first port 842a and the second port 842b), but according to other embodiments, one or three or more ports may be included in the external device connection part 840.

The wiring device (for example, the wiring device 400 or the wiring device 800) according to the above-described various embodiments may be used during a procedure of testing and optimizing modules connected thereto. The wiring device may be temporarily used in the procedure of testing and optimizing. If the wiring device is temporarily used in the middle of testing and optimizing, the wiring device installed in a finally produced product may be different from the wiring device according to the above-described embodiments of the disclosure. For example, the wiring device installed in the produced product may not include an external device connection part (for example, the external device connection part 440).

However, the wiring device according to embodiments of the disclosure and the wiring device installed in the produced product may be designed with the same structure in components for coupling with modules (for example, the first connector part 410, the second connector part 420). In this case, the wiring device according to embodiments of the disclosure can be used without changing the existing modules, and the procedure of testing and optimizing can be easily performed. Furthermore, since the modules are tested and optimized in the same condition and the same state as in the produced product, testing and optimizing conforming to a real use state of the product can be performed.

According to various embodiments, an apparatus for connecting modules included in an electronic device (for example, the electronic device 101) may include: at least one line part (for example, the first lien part 430a, the second line part 430b) including lines (for example, the power line 432, the control signal line 434, the first IF/RF signal line 436a, the second IF/RF signal line 436b) configured to transmit a power, a control signal, an IF signal, or an RF signal between a first module (for example, the third antenna module 346) of the electronic device and a second module (for example, the wireless communication module 192) of the electronic device; a first connector part (for example, the first connector part 410) configured to connect at least one of the lines with the first module; a second connector part (for example, the second connector part 420) configured to connect at least one of the lines with the second module; and a connection part (for example, the external device connection part 440) configured to connect at least one line for transmitting the IF signal or the RF signal from among the lines with at least one external device. The at least one line for transmitting the IF signal or the RF signal may include a first line connected to the first connector part to exchange signals with the first module, and a second line connected to the second connector part to exchange signals with the second module, and the connection part may include a first port connected with the first line and a second port connected with the second line.

According to various embodiments, the at least one line part (for example, the first line part 430a, the second line part 430b) may include: a first line part (for example, the first line part 430a) configured to connect between the first connector part (for example, the first connector part 410) and the second connector part (for example, the second connector part 420); and a second line part (for example, the second line part 430b) configured to connect between the second connector part and the connection part (for example, the external device connection part 440).

According to various embodiments, the first line part (for example, the first line part 430a) may be connected with the second connector part on one surface of the second connector part (for example, the second connector part 420), and the second line part (for example, the second line part 430b) may be connected with the second connector part on the other surface positioned opposite to the one surface of the second connector part.

According to various embodiments, the at least one line part (for example, the first line part 430a, the second line part 430b) may be configured with an FPCB.

According to various embodiments, the first connector part (for example, the first connector part 410) may include a first connector (for example, the first connector 414) including at least one port to connect at least one of the lines (for example, the power line 432, the control signal line 434, the first IF/RF signal line 436a, the second IF/RF signal line 436b) with a circuit in the first module (for example, the third antenna module 346), and the second connector part (for example, the second connector part 420) may include a second connector (for example, the second connector 424) including at least one port to connect at least one of the lines with a circuit in the second module (for example, the wireless communication module 192).

According to various embodiments, the second connector part (for example, the second connector part 420) may be connected with the connection part (for example, the external device connection part 440) through one line part (for example, the second line part 430b) of the at least one line part (for example, the first line part 430a, the second line part 430b), and the second connector (for example, the second connector 424) may protrude in a direction perpendicular to a direction in which the one line part is connected.

According to various embodiments, the first connector (for example, the first connector 414) may be configured to protrude from a first substrate included in the first connector part (for example, the first connector part 410) in a first direction, and the second connector (for example, the second connector 424) may be configured to protrude from a second substrate included in the second connector part (for example, the second connector part 420) in a second direction which is opposite to the first direction.

According to various embodiments, the first module (for example, the third antenna module 346) may include a circuit configured to process an RF band signal, and the second module (for example, the wireless communication module 192) may include a circuit configured to process a baseband signal and an IF band signal.

According to various embodiments, the first module (for example, the third antenna module 346) may include a circuit configured to process a millimeter wave band signal, and the second module (for example, the wireless communication module 192) may include a circuit configured to process a baseband signal and a band signal which is lower than the millimeter wave band.

According to various embodiments, the first module (for example, the third antenna module 346) may include at least one antenna.

According to various embodiments, the at least one line part may include: a first line part (for example, the first line part 830a) configured to connect between the first connector part (for example, the first connector part 810) and the connection part (for example, the external device connection part 840); and a second line part (for example, the second line part 830b) configured to connect between the connection part and the second connector part (for example, the second connector part 820).

According to various embodiments, the wiring device may provide a line for transmitting signals or power between modules included in the electronic device 101, and may additionally provide a means (for example, the external device connection part 440) for connecting with an external measurement device. In the case of the wiring device described above, the line for transmitting signals or power and the means for connecting with the external measurement device are integrally designed, but according to another embodiment, the line for transmitting signals or power and the means for connecting with the external measurement device may be designed to be separable from each other. Hereinafter, embodiments of a wiring device in which a line for transmitting signals or power and a means for connecting with an external measurement device are designed to be separable from each other will be described.

Figure 9:
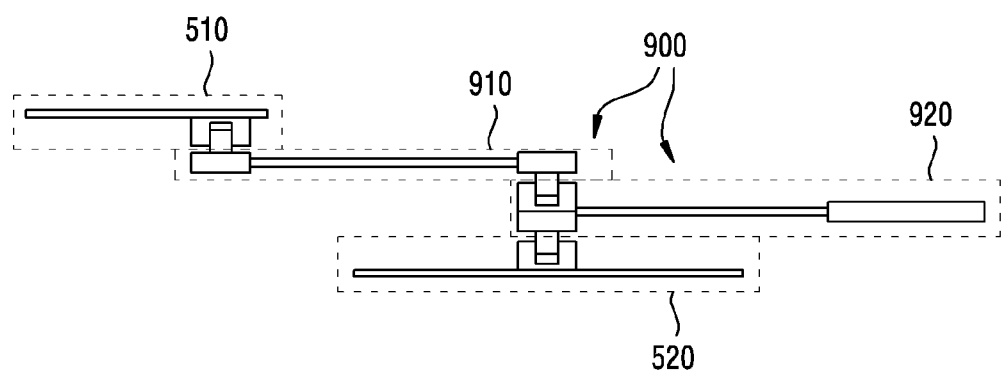
FIG. 9 is a view illustrating another example of a state in which a wiring device connects modules for communication according to various embodiments of the disclosure.

FIG. 9 illustrates another example of a state in which a wiring device 900 connects modules for communication according to various embodiments of the disclosure. FIG. 9 illustrates an example of a state in which a first part 910 and a second part 920 of the wiring device 900 are connected with a first module 510 and a second module 520 for communication. Herein, the first module 510 may be the first module 510 of FIG. 5 or the third antenna module 346 of FIG. 3, and the second module 520 may be the second module 520 of FIG. 5 or the wireless communication module 192 of FIG. 3.

Referring to FIG. 9, the first module 510 and the first part 910 of the wiring device 900 may be connected with each other, and the second module 520 and the second part 920 of the wiring device 900 may be connected with each other. In addition, the first part 910 of the wiring device 900 and the second part 920 of the wiring device 900 may be connected with each other. The first part 910 of the wiring device 900 may be indirectly connected with the second module 520 through the second part 920 of the wiring device 900, such that signals or power can be transmitted between the first module 510 and the second module 520. The second part 920 of the wiring device 900 may be indirectly connected with the first module 510 through the first part 910 of the wiring device 900, thereby being connected to a signal line between the first module 510 and the second module 520. As in the example of FIG. 9, the first part 910 and the second part 920 are designed to be separable from each other, so that the second part 920 can be used for general purpose regardless of arrangements of the first module 510 and the second module 520.

FIGS. 10A to 10D illustrate a configuration of the first part 910 of the wiring device 900 according to various embodiments of the disclosure.

Figure 10A:
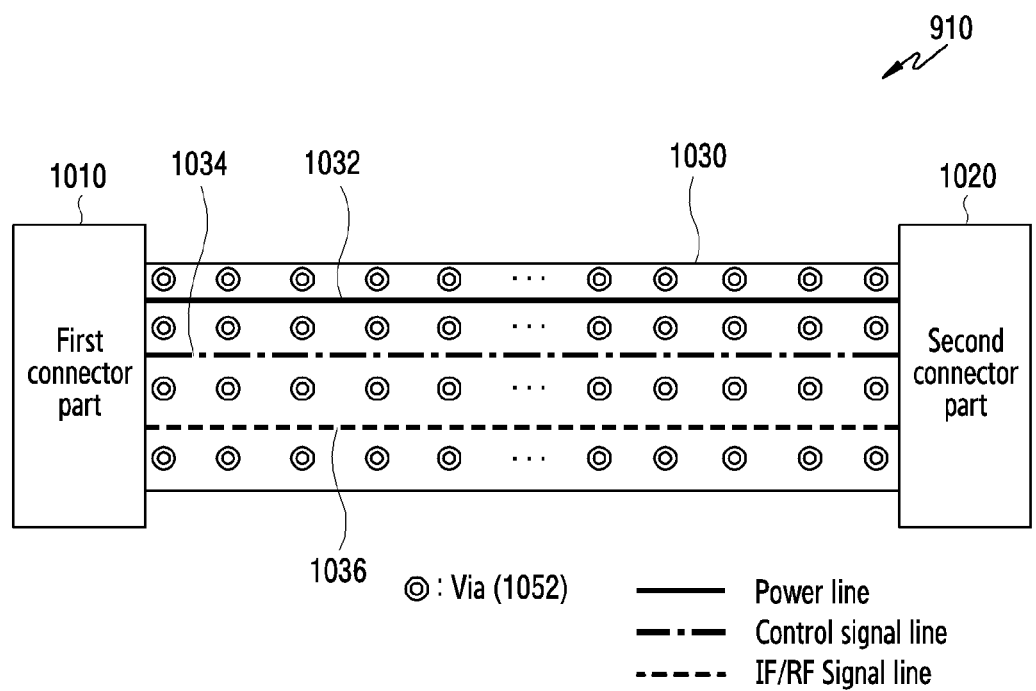
FIGS. 10A to 10D are views illustrating a configuration of a first part of the wiring device according to various embodiments of the disclosure.

Referring to FIG. 10A, the first part 910 of the wiring device 900 may include at least one of a first connector part 1010, a second connector part 1020, or a line part 1030.

The first connector part 1010 may be a component for connecting to a connector of a first module of the first module (for example, the first module 510) and a second module (for example, the second module 520) which are connected with each other through the wiring device 900, and the second connector part 1020 may be a component for connecting with the second module or the second part 920 of the wiring device 900. Each of the first connector part 1010 and the second connector part 1020 may include a substrate of a rigid material which has less flexibility and/or a connector disposed on the substrate. The first connector part 1010 may include a connector being in contact with the first module, and may be configured similarly to the first connector part 410 of FIG. 4A. The second connector part 1020 may include a connector being in contact with the second part 920 of the wiring device 900, and thus may be referred to as an "intermediate connection connector part", an "intermediate connector part", an "inner connector part" or a term having the same technical meaning as the above-mentioned terms.

Figure 10B:
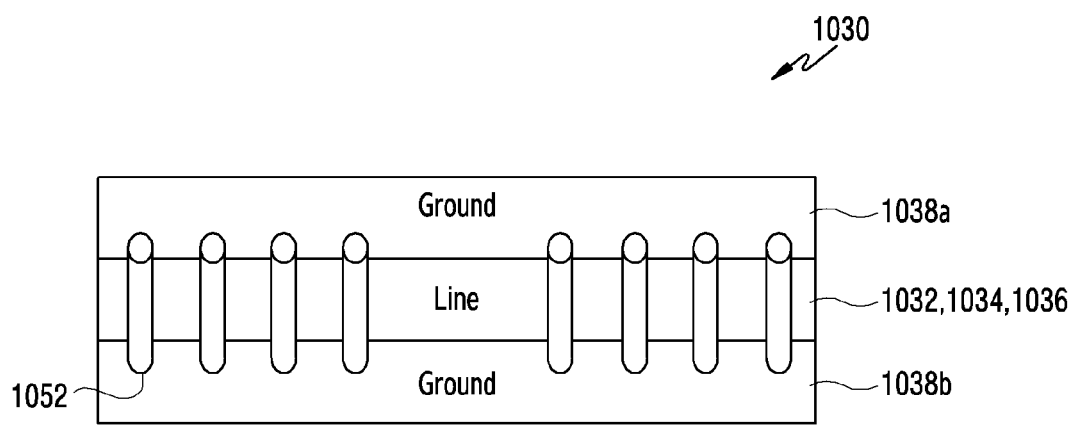

The line part 1030 may include a power line 1032, a control signal line 1034, and/or an IF/RF signal line 1036. The line part 1030 may further include vias 1052 for shielding between the power line 1032, the control signal line 1034, the IF/RF signal line 1036. For example, as shown in FIG. 10B, the vias 1052 may be connected to an upper end ground 1038a and a lower end ground 1038b of the line part 1030, and may be disposed to penetrate through an area where the power line 1032, the control signal line 1034, and/or the IF/RF signal line 1036 are disposed. An appropriate number of vias 1052 may be disposed at appropriate intervals in order to guarantee flexibility of the line part 1030. For example, the vias 1052 may be disposed at an interval of about 1 mm or more.

Figure 10C:
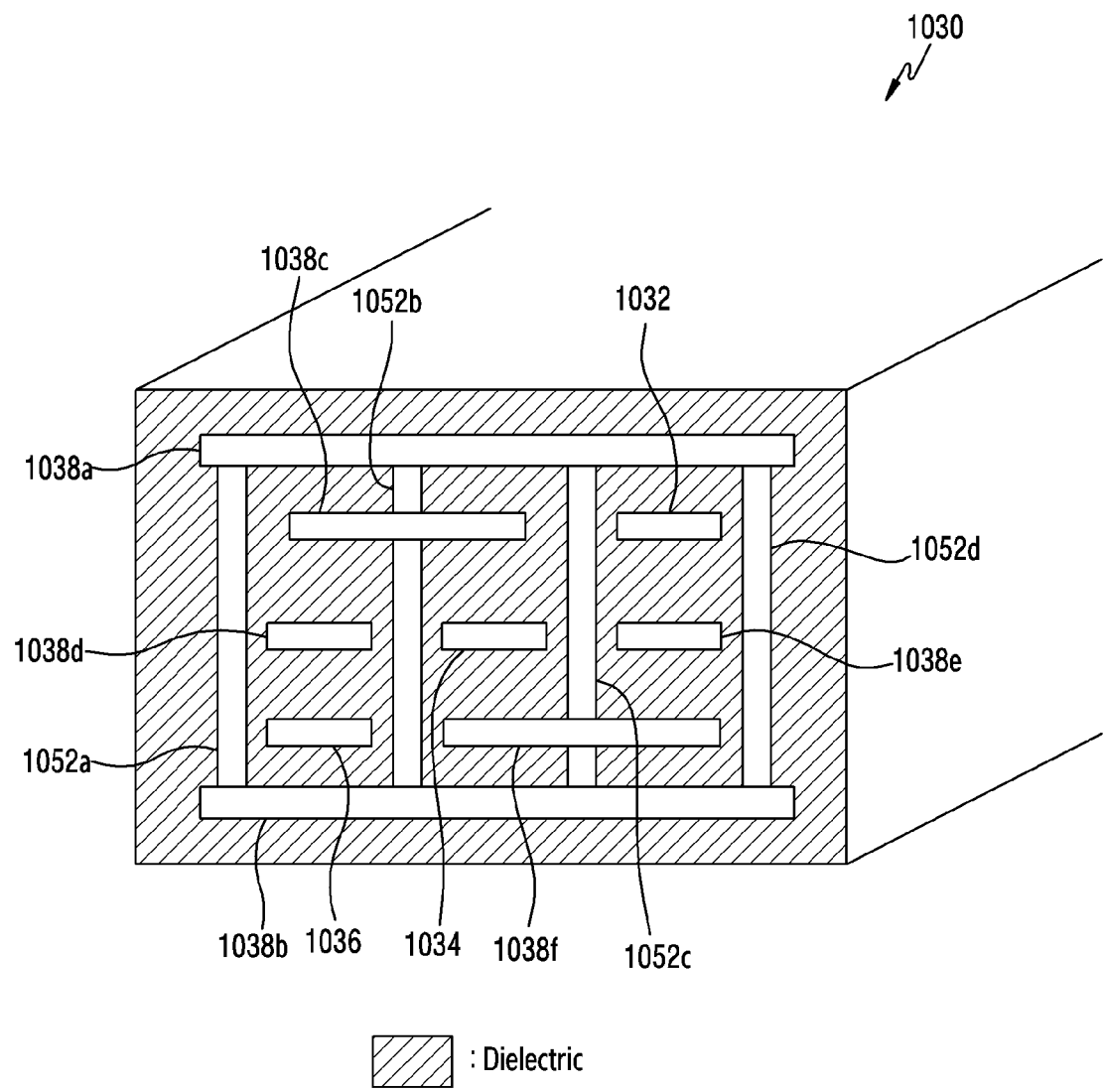
Figure 10D:
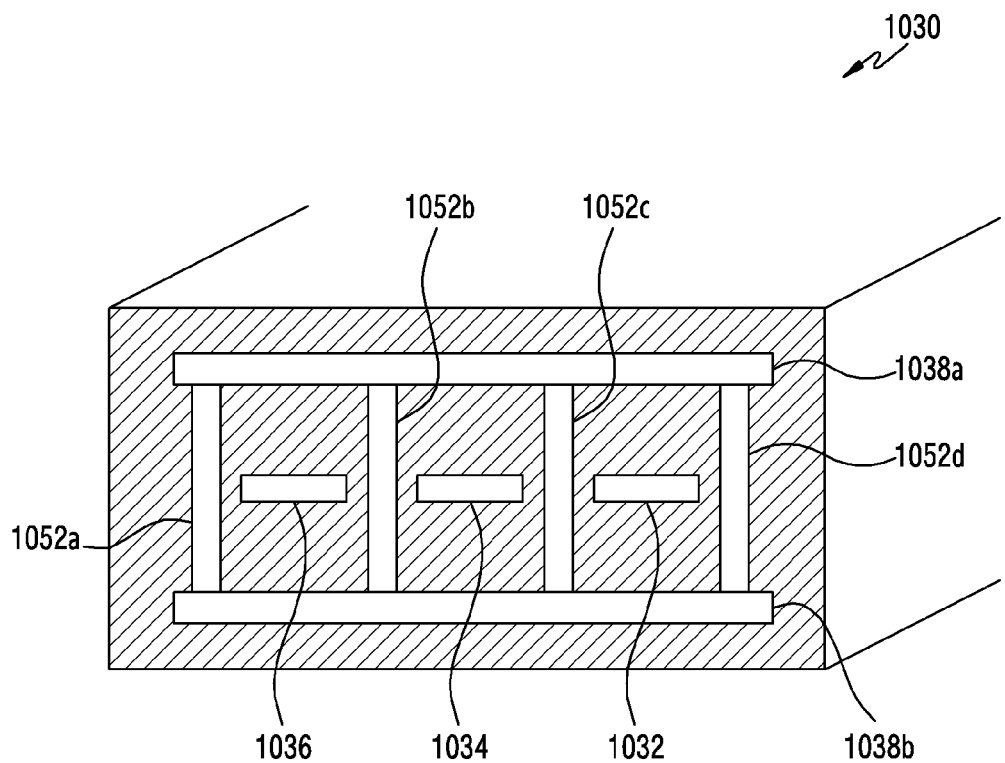

According to various embodiments, a cross section of the line part 1030 may be as shown in FIG. 10C or 10D. FIG. 10C illustrates an example of the power line 1032, the control signal line 1034, and/or the IF/RF signal line 1036 being disposed in different layers, and FIG. 10D illustrates an example of the power line 1032, the control signal line 1034, and/or the IF/RF signal line 1036 being disposed in the same layer. In FIG. 10C or 10D, a dielectric included in the line part 1030 may be configured with a material having a low dissipation factor (DF) and a low dielectric constant (DK) characteristic.

Referring to FIG. 10C, the line part 1030 may include the upper end ground 1038a and the lower end ground 1038b. The power line 1032, the control signal line 1034, and/or the IF/RF signal line 1036 may be disposed in different layers between the upper end ground 1038a and the lower end ground 1038b. Grounds 1038c, 1038d, 1038e may be disposed in areas other than areas occupied by the power line 1032, the control signal line 1034, or the IF/RF signal line 1036 in the respective layers. Since the power line 1032, the control signal line 1034, and/or the IF/RF signal line 1036 are disposed on different positions along the horizontal axis, vias 1052a, 1052b, 1052c, 1052d may be disposed between the power line 1032, the control signal line 1034, and/or the IF/RF signal line 1036 to reduce interference between the power line 1032, the control signal line 1034, and/or the IF/RF signal line 1036.

Referring to FIG. 10D, the line part 1030 may include the upper end ground 1038a and the lower end ground 1038b. The power line 1032, the control signal line 1034, and/or the IF/RF signal line 1036 may be disposed in the same layer between the upper end ground 1038a and the lower end ground 1038b. Since the power line 1032, the control signal line 1034, and/or the IF/RF signal line 1036 are disposed on different positions along the horizontal line, the vias 1052a, 1052b, 1052c, 1052d may be disposed between the power line 1032, the control signal line 1034, and/or the IF/RF signal line 1036 to reduce interference between the power line 1032, the control signal line 1034, and/or the IF/RF signal line 1036.

Figure 11A:
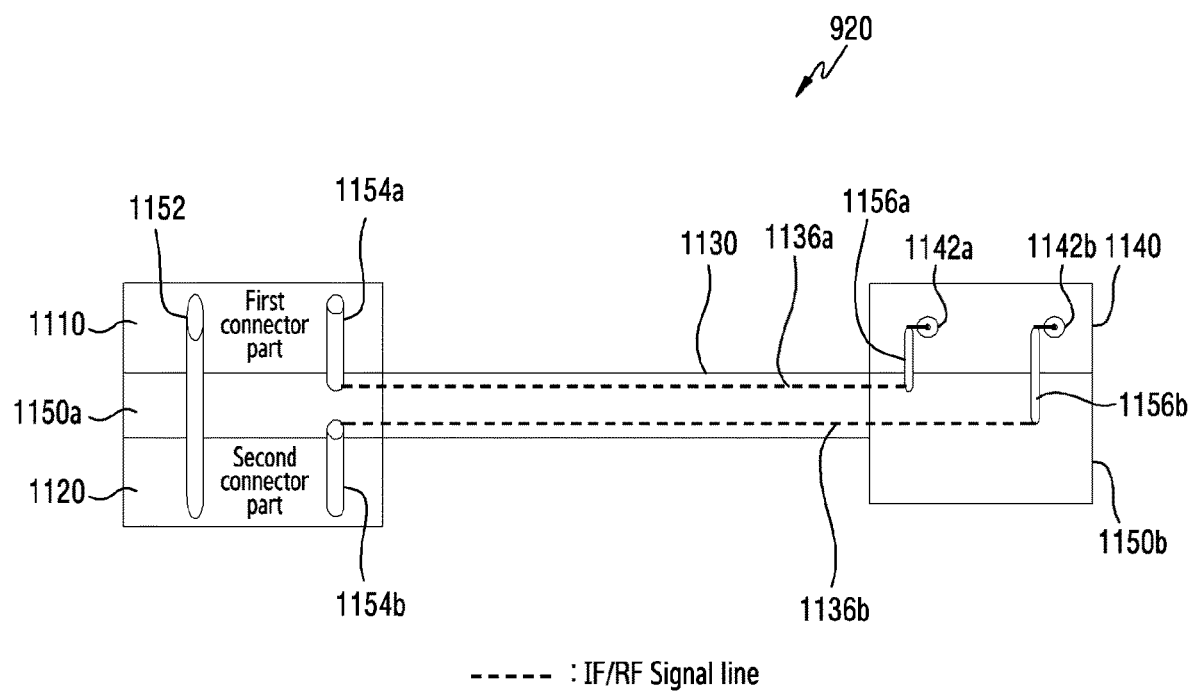
FIGS. 11A and 11B are views illustrating a configuration of a second part of the wiring device according to various embodiments of the disclosure.
Figure 11B:
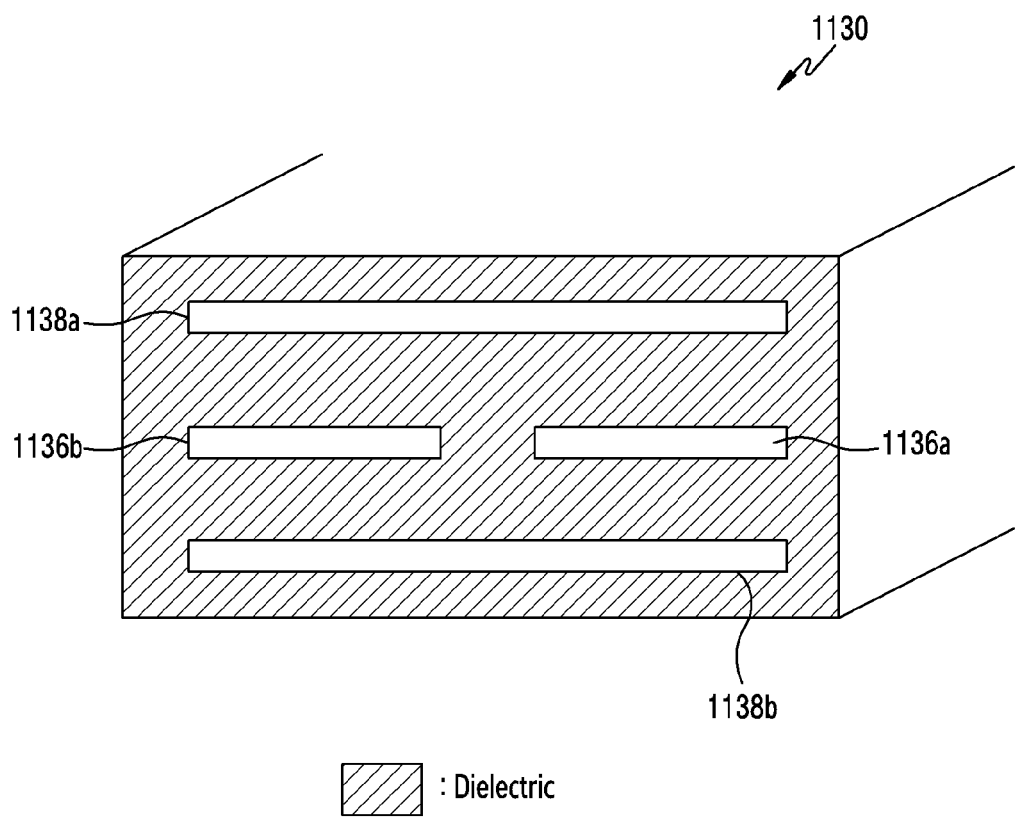

FIGS. 11A and 11B illustrate a configuration of the second part 920 of the wiring device 900 according to various embodiments of the disclosure.

Referring to FIG. 11A, the second part 920 of the wiring device 900 may include at least one of a first connector part 1110, a second connector part 1120, a line part 1130, an external device connection part 1140, a first coupling part 1150a, or a second coupling part 1150b.

The first connector part 1110 may be a component for connecting with the first part 910 of the wiring device 900, and the second connector part 1120 may be a component for connecting with the second module. Each of the first connector part 1110 and the second connector part 1120 may include a substrate of a rigid material which has less flexibility, and/or a connector disposed on the substrate. The connector included in the first connector part 1110 may be configured similarly to a connector of the first module or the second module (for example, the connector 614 or the connector 628). Since the first connector part 1120 includes the connector being in contact with the first part 910 of the wiring device 900, the first connector part 1120 may be referred to as an "intermediate connection connector part", an "intermediate connector part", an "internal connector part", or a term having the same technical meaning as the above-mentioned terms. The first connector part 1110 may be assembled with the second connector part 1020 of the first part 910 of the wiring device 900, and the first connector part 1110 and the second connector part 1020 may have a removable structure. The second connector part 1120 may include a connector being in contact with the second module, and may be configured similarly to the second connector part 420 of FIG. 4A.

The line part 1130 may be a set of lines disposed between the first connector part 1110, the second connector part 1120, and the external device connection part 1140, and members for supporting the lines. The line part 1130 may include a first IF/RF signal line 1136*a* and/or a second IF/RF signal line 1136*b*. The first IF/RF signal line 1136*a* may be connected with the first module through the first connector part 1110, and the second IF/RF signal line 1136*b* may be connected with the second module through the second connector part 1120. The line part 1130 may be configured similarly to the second line part 430*b* of FIG. 4. For example, referring to FIG. 11B, the line part 1130 may include an upper end ground 1138*a* and a lower end ground 1138*b*, and may include the first IF/RF signal line 1136*a* and/or the second IF/RF signal line 1136*b* disposed between the upper end ground 1138*a* and the lower end ground 1138*b*.

The external device connection part 1140 may be a component for connecting an external device (for example, a measurement device). The external device connection part 1140 may include at least one port (for example, a first port 1142*a* or a second part 1142*b*), and a circuit board for supporting the at least one port. Each of the first port 1142*a* and the second port 1142*b* may be a structure for fastening a cable to connect with an external device. The first port 1142*a* may be connected with the first IF/RF signal line 1136*a* connected with the first connector part 1110 through a via 1156*a*, and the second port 1142*b* may be connected with the second IF/RF signal line 1136*b* connected with the second connector part 1120 through a via 1156*b*. The external device connection part 1140 may be configured similarly to the external device connection part 440 of FIG. 4.

The first coupling part 1150*a* may include a structure for coupling between the first connector part 1110, the second connector part 1120, the line part 1130. The first coupling part 1150*a* may include a ground, and may be configured with a rigid material which has less flexibility to fix the first connector part 1110, the second connector part 1120, and the line part 1130.

The second coupling part 1150*b* may include a structure for coupling between the line part 1130 and the external device connection part 1140. The second coupling part 1150*b* may include a ground, and may be configured with a rigid material which has less flexibility to fix the line part 1130 and the external device connection part 1140.

The second part 920 of the wiring device 900 may include at least one via 1152 to transmit power and a control signal between the first connector part 1152*a*, 1110 and the second connector part 1152*b*, 1150, 1120. In the connection state as shown in FIG. 9, one end of the at least one via 1152 may be connected with the power line 1032 and/or the control signal line 1034 of the line part 1030 of the first part 910 of the wiring device 900 through the first connector part 1110 and the second connector part 1020, 1120, and the other end of the at least one via 1152 may be connected with the second module through the second connector part 1120.

The second part 920 of the wiring device 900 may include a via 1154*a* to transmit an IF/RF signal between the first connector part 1152*a*, 1110 and the first IF/RF line 1136*a*, and a via 1154*b* to transmit an IF/RF signal between the second connector part 1152*b*, 1120 and the second IF/RF line 1136*b*. In the connection state as shown in FIG. 9, the via 1154*a* may connect the first IF/RF line 1136*a* and the second IF/RF line 1136 of the first part 910 of the wiring device 900, and the via 1154*b* may connect the second IF/RF line 1136*b* and the second module.

In the above-described various embodiments, the external device connection part 1140 may include at least one port.

According to other embodiments, the external device connection part 1140 may include at least one circuit element in addition to the at least one port. An additional device such as a filter may be needed to perform a measuring operation of an external device connected to the external device connection part 1140, that is, a measurement device. In this case, the additional device may be connected to at least one port provided in the external device connection part 1140 by using a cable, etc., but the connection structure may be complicated. The inconvenience of having to use an additional device can be solved by mounting a filter, etc. in the external device connection part 1140.

Figure 12A:
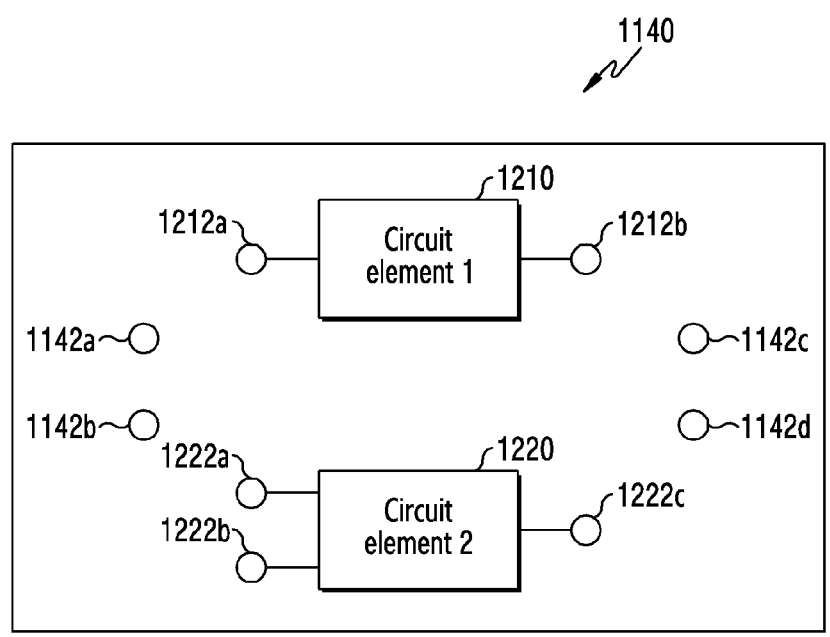
FIGS. 12A and 12B are views illustrating a configuration of an external device connection part according to various embodiments of the disclosure.
Figure 12B:
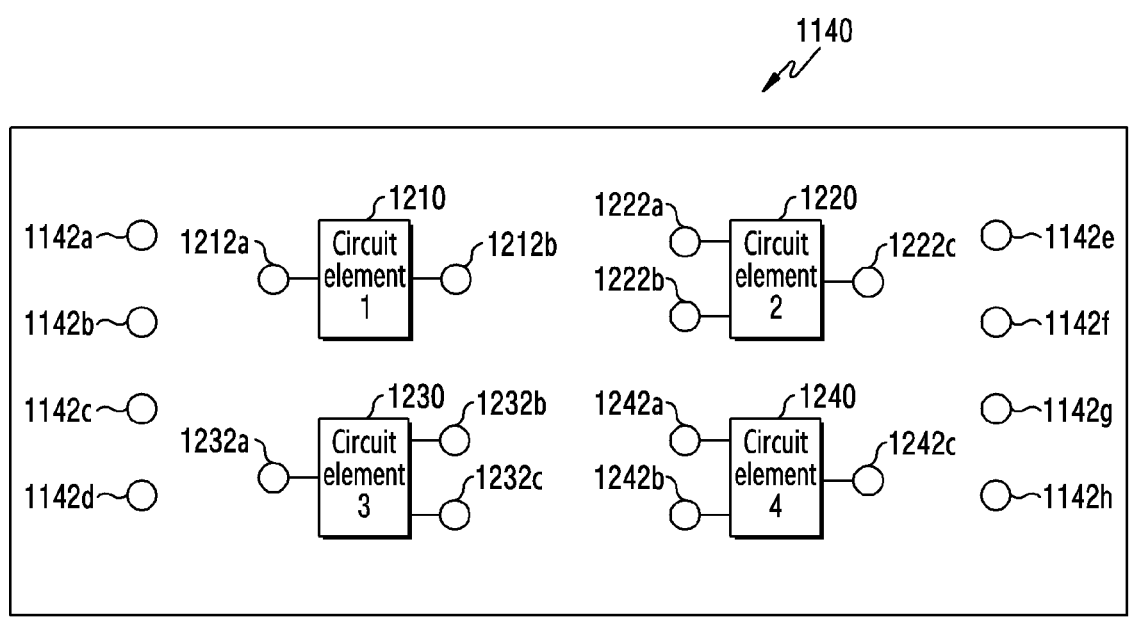

FIGS. 12A and 12B illustrate a configuration of the external device connection part 1140 according to various embodiments of the disclosure. FIG. 12A illustrates an example of two circuit elements being installed, and FIG. 12B illustrates an example of four circuit elements being installed.

Referring to FIG. 12A, the external device connection part 1140 may include ports 1142*a*, 1142*b*, 1142*c*, 1142*d*. A circuit element 1 1120, a circuit element 2 1220 may be installed in the external device connection part 1140 along with ports 1212*a*, 1212*b* connected to the circuit element 1 1210, ports 1222*a*, 1222*b*, 1222*c* connected to the circuit element 2 1220. At least some of the ports 1142*a*, 1142*b*, 1142*c*, 1142*d*, the ports 1212*a*, 1212*b*, and/or the ports 1222*a*, 1222*b*, 1222*c* may be connected with one another by using at least one cable.

Referring to FIG. 12B, the external device connection part 1140 may include ports 1142*a*, 1142*b*, 1142*c*, 1142*d*, 1142*e*, 1142*f*, 1142*g*, 1142*h*. A circuit element 1 1210, a circuit element 2 1220, a circuit element 3 1230, a circuit element 4 1240 may be installed in the external device connection part 1140, along with ports 1212*a*, 1212*b* connected to the circuit element 1 1210, ports 1222*a*, 1222*b*, 1222*c* connected to the circuit element 2 1220, ports 1232*a*, 1232*b*, 1232*c*, connected to the circuit element 3 1230, ports 1242*a*, 1242*b*, 1242*c* connected to the circuit element 4 1240. At least some of the ports 1142*a*, 1142*b*, 1142*c*, 1143*d*, 1143*e*, 1143*f*, 1143*g*, 1143*h*, the ports 1212*a*, 1212*b*, the ports 1222*a*, 1222*b*, 1222*c*, the ports 1232*a*, 1232*b*, 1232*c*, and/or the ports 1242*a*, 1242*b*, 1242*c* may be connected with one another by using at least one cable.

The circuit elements shown in FIGS. 12A and 12B may be variously selected according to an intention of a practice of the disclosure. For example, each of the circuit elements may be any one of a filter, a coupler, a divider, a switch. More detailed examples of functions of the circuit element will be described hereinbelow with reference to FIGS. 13A and 13B.

Figure 13A:
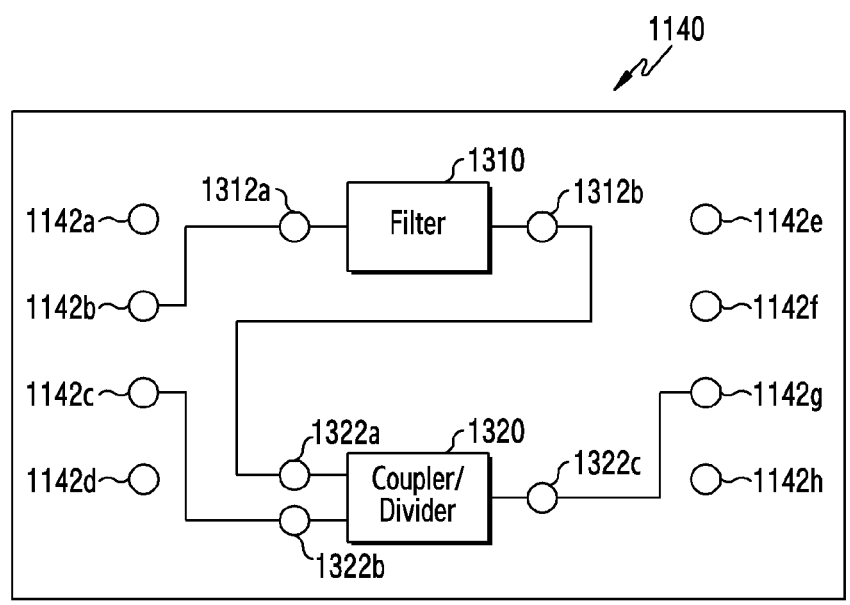
FIGS. 13A and 13B are views illustrating detailed examples of the configuration of the external device connection part according to various embodiments of the disclosure.
Figure 13B:
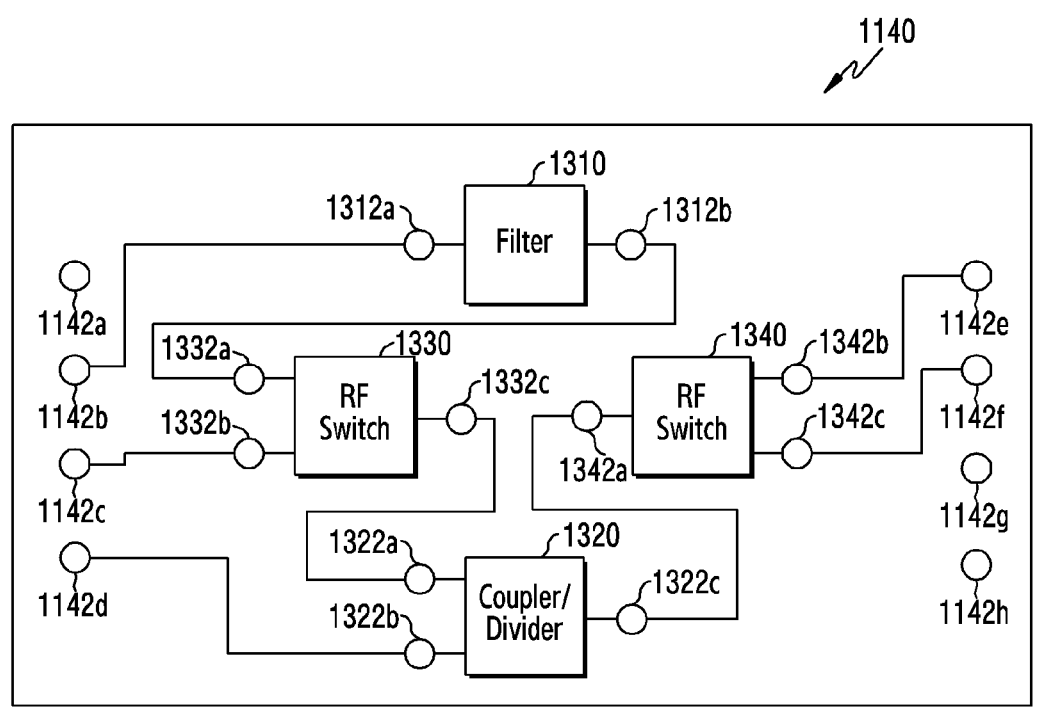

FIGS. 13A and 13B illustrate detailed examples of the configuration of the external device connection part 1140 according to various embodiments of the disclosure. FIGS. 13A and 13B illustrate an example of a configuration to which a wire is added according to a purpose, and FIG. 13A illustrates an example of two circuit elements being installed, and FIG. 13B illustrates an example of four circuit elements being installed.

Referring to FIG. 13A, the external device connection part 1140 may include ports 1142*a*, 1142*b*, 1142*c*, 1142*d*, 1142*e*, 1142*f*, 1142*g*, 1142*h*. The ports 1142*a*, 1142*b*, 1142*c*, 1142*d* may be used as input ports, and the ports 1142*e*, 1142*f*, 1142*g*, 1142*h* may be used as output ports. A filter 1310, a coupler/divider 1320 may be installed in the external device connection part 1140 along with ports 1312*a*, 1212*b* connected with the filter 1310, ports 1322*a*, 1222*b* connected to the coupler/divider 1320. The port 1142*b* may be connected with the port 1312*a*, and the port 1312*b* may be connected with the port 1322*a*. The port 1142*c* may be connected with the port 1322*b*, and the port 1322*c* may be connected with the port 1142*g*. The wire for connecting between the ports may be an external cable or may be a single line that is installed in a substrate of the external device connection part 1140.

Referring to FIG. 13B, the external device connection part 1140 may include ports 1142*a*, 1142*b*, 1142*c*, 1142*d*, 1142*e*, 1142*f*, 1142*g*, 1142*h*. The ports 1142*a*, 1142*b*, 1142*c*, 1142*d* may be used as input ports, and the ports 1142*e*, 1142*f*, 1142hg, 1142*h* may be used as output ports. A filter 1310, a coupler/divider 1320, an RF switch 1330, an RF switch 1340 may be installed in the external device connection part 1140, along with ports 1313*a*, 1313*b* connected to the filter 1310, ports 1322*a*, 1322*b*, 1322*c* connected to the coupler/divider 1320, ports 1332*a*, 1332*b*, 1332*c* connected to the RF switch 1330, and ports 1342*a*, 1342*b*, 1342*c* connected to the RF switch 1340. The port 1142*a* may be connected with the port 1312*a*, and the port 1312*b* may be connected with the port 1332*a*. The port 1142*c* may be connected with the port 1332*b*, and the port 1332*c* may be connected with the port 1322*a*. The port 1142*d* may be connected with the port 1322*b*, and the port 1322*c* may be connected with the port 1342*a*. The port 1342*b* may be connected with the port 1142*e*, and the port 1342*c* may be connected with the port 1142*f*. The wire for connecting between the ports may be an external cable or may be a signal line that is installed in a substrate of the external device connection part 1140.

Figure 14A:
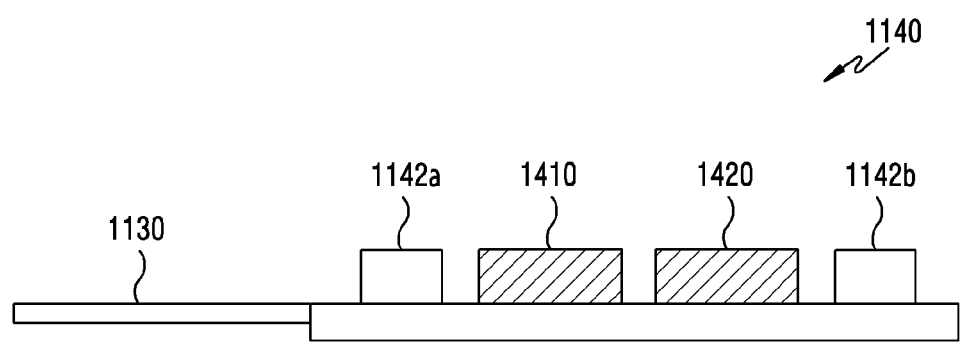
FIGS. 14A and 14B are views illustrating examples of arrangements of circuit elements of the external device connection part according to various embodiments of the disclosure.
Figure 14B:
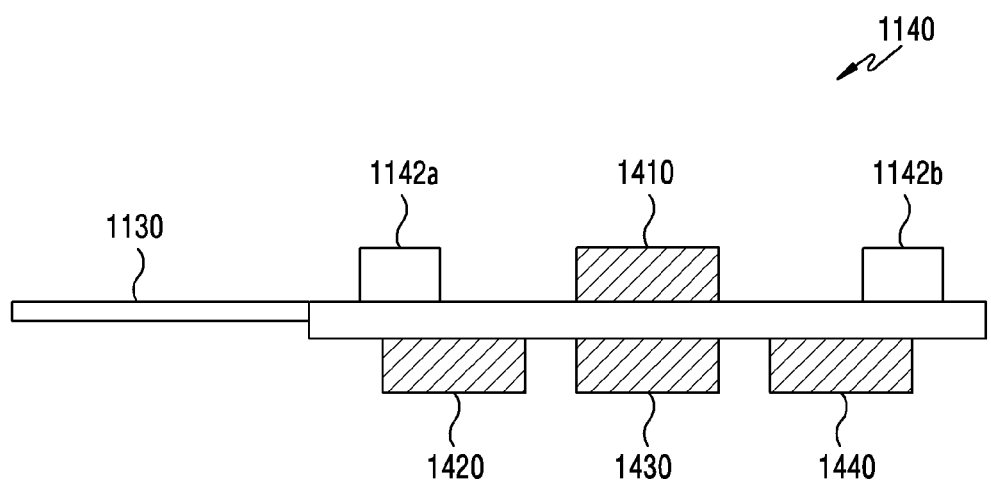

FIGS. 14A and 14B illustrate examples of arrangements of circuit elements of the external device connection part 1140 according to various embodiments of the disclosure. FIG. 14A illustrates a case where circuit elements are disposed on one surface of a substrate of the external device connection part 1140, and FIG. 14B illustrates a case where circuit elements are disposed on both surfaces of the substrate of the external device connection part 1140. Referring to FIG. 14A, circuit elements 1410, 1420 may be installed on the same surface as that of ports 1142*a*, 1142*b*. Referring to FIG. 14B, some circuit element 1410 of circuit elements 1410, 1420, 1430, 1440 may be installed on the same surface as that of ports 1142*a*, 1142*b*, and the other circuit elements 1420, 1430, 1440 may be installed on the opposite surface of the surface where the ports 1142*a*, 1142*b* are installed.

FIGS. 15A to 15D illustrate use states of the wiring device according to various embodiments of the disclosure. FIGS. 15A to 15D illustrate states in which a first module 510 and a second module 520 are disposed in the electronic device 101, and a wiring device is assembled with the modules 510, 520 to make it possible to measure by using an external device.

Figure 15A:
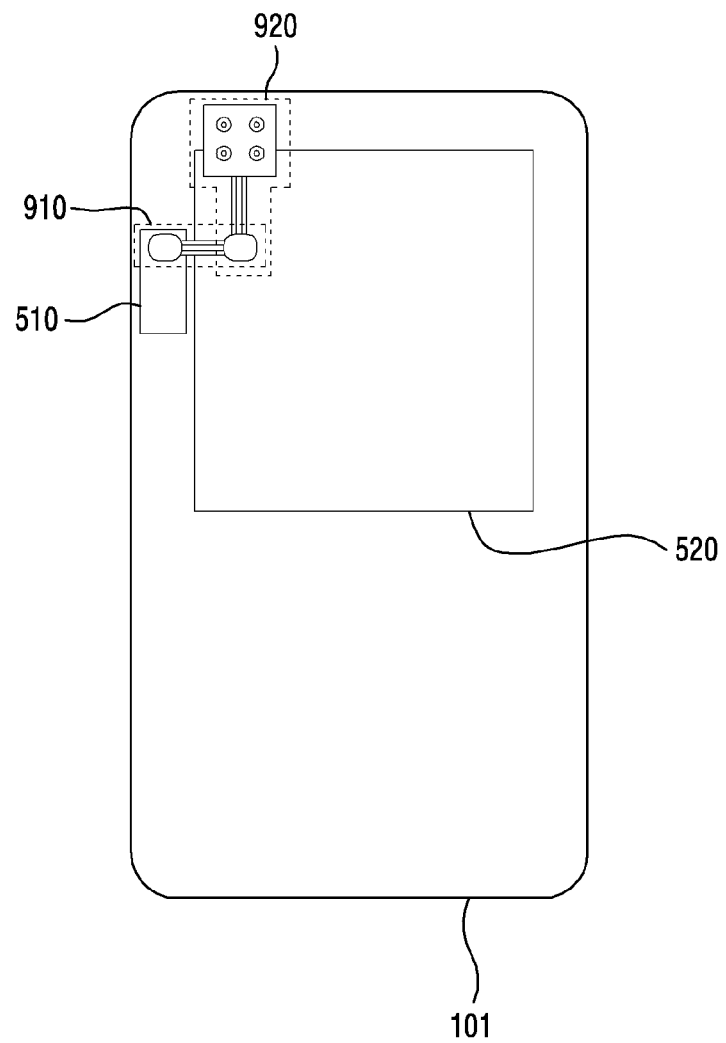
FIGS. 15A to 15D are views illustrating use states of a wiring device according to various embodiments of the disclosure.

Referring to FIG. 15A, the first module 510 may be disposed on a left side of the electronic device 101, and the second module 520 may be disposed on a center of the electronic device 101. The second part 920 of the wiring device may be connected to the second module 520, and the first part 910 of the wiring device may be connected to the second part 920 and the first module 510. To achieve this, the first part 910 may be designed in consideration of arrangements of the first module 510 and the second module 520.

Figure 15B:
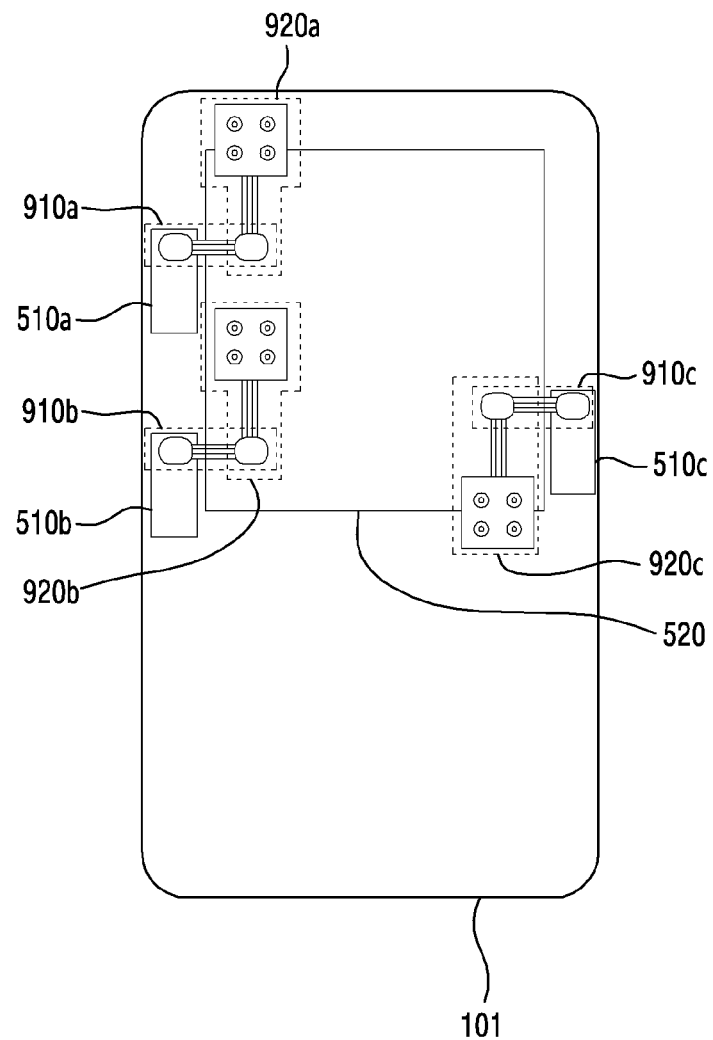

Referring to FIG. 15B, three first modules 510*a*, 510*b*, 510*c* may be disposed on a left upper end, a left lower end, and a right side of the electronic device 101, and a second module 520 may be disposed on a center of the electronic device 101. Three second parts 920*a*, 920*b*, 920*c* of the wiring device may be connected to three connectors provided in the second module 520, and first parts 910*a*, 910*b*, 910*c* of the wiring device may be connected to respective pairs of the second parts 920*a*, 920*b*, 920*c* and the first modules 510*a*, 510*b*, 510*c*. To achieve this, the first parts 910*a*, 910*b*, 910*c* may be designed in consideration of arrangements of the first modules 510*a*, 510*b*, 510*c* and the second module 520. FIG. 15B is for a case where the electronic device 101 includes a plurality of antenna modules (for example, the first modules 510*a*, 510*b*, 510*c*), and may be utilized for a case where a large amount of specimens is tested between mass production and development.

Figure 15C:
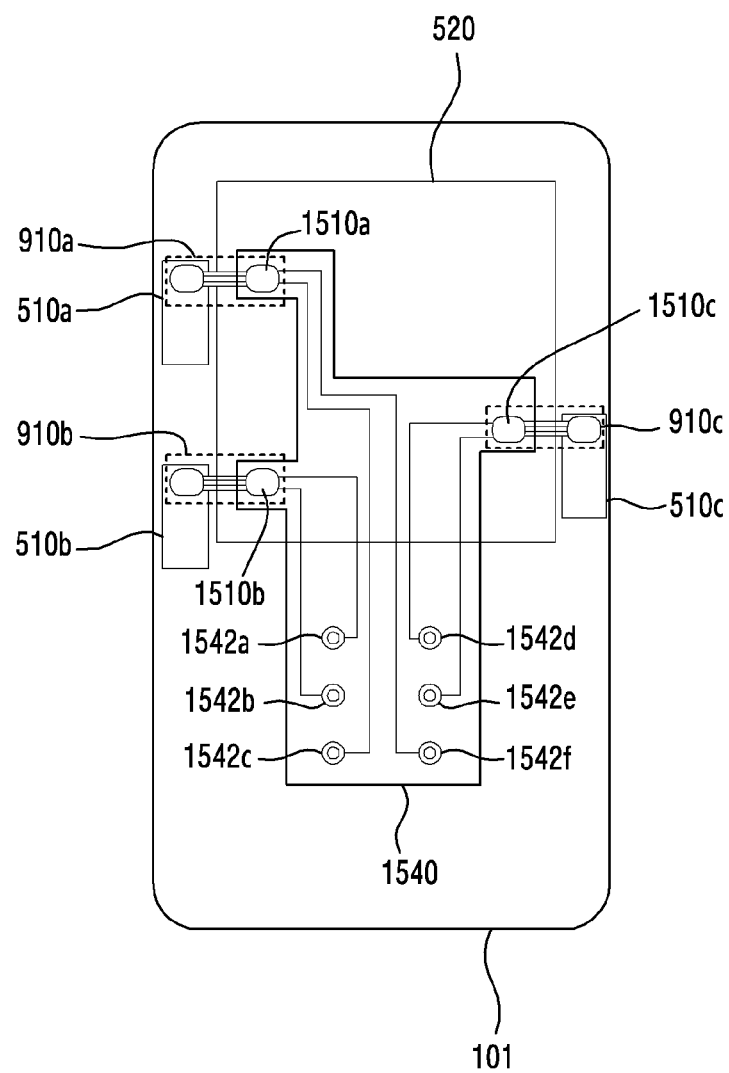

Referring to FIG. 15C, three first modules 510*a*, 510*b*, 510*c* may be disposed on a left upper end, a left lower end, and a right side of the electronic device 101, and the second module 520 may be disposed on a center of the electronic device 101. A second part 1540 of the wiring device may be connected to three connectors provided in the second module 520, and the first parts 910*a*, 910*b*, 910*c* of the wiring device may be connected to the second part 1540 and the first modules 510*a*, 510*b*, 510*c*, respectively. To achieve this, the second part 1540 may include three connectors 1510*a*, 1510*b*, 1510*c*, and may include a plurality of ports 1542*a*, 1542*b*, 1542*c*, 1542*d*, 1542*e*, 1542*f* for connecting an external measurement device. The plurality of ports 1542*a*, 1542*b*, 1542*c*, 1542*d*, 1542*e*, 1542*f* may be split into three pairs of ports, and the respective pairs of ports may be connected with the connector parts 1510*a*, 1510*b*, 1510*c*, respectively. FIG. 15C is for a case where the electronic device 101 includes a plurality of antenna modules (for example, the first modules 510*a*, 510*b*, 510*c*, and illustrates an integral structure in which the second part 1540 is designed to accommodate a connection with the plurality of first modules 510*a*, 510*b*, 510*c*. All of the lines may be tested with the second part 1540 of the integral structure being connected. To achieve this, the second part 1540 may be designed in consideration of positions of connectors included in the second module 520.

Figure 15D:
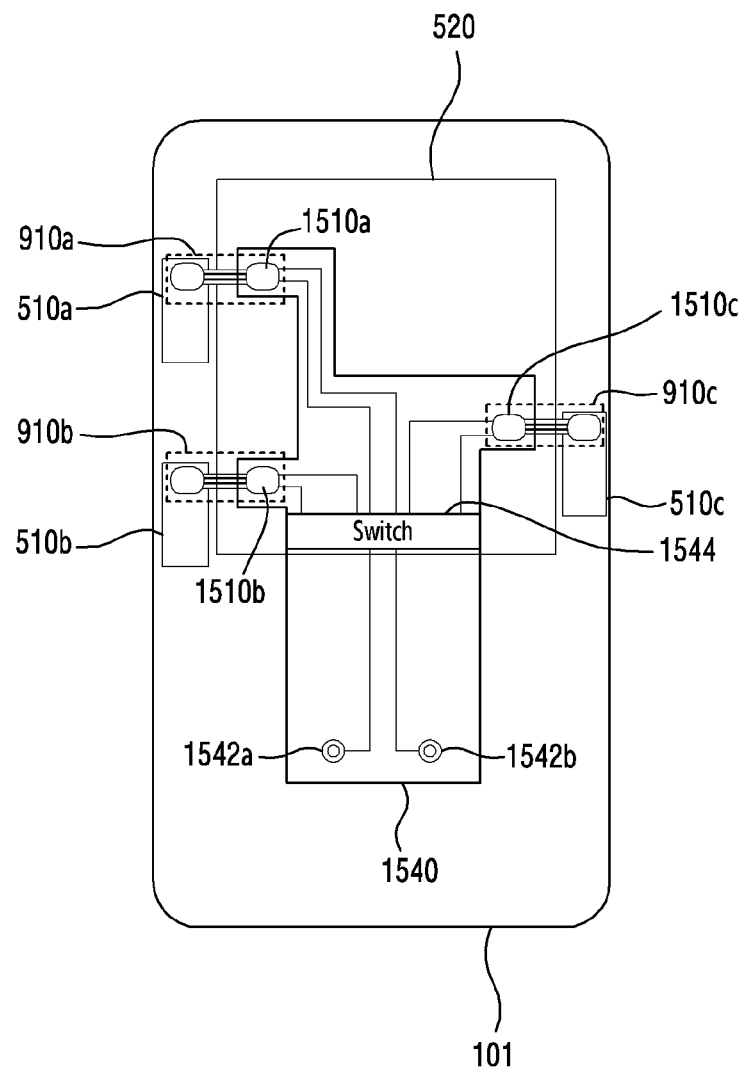

Referring to FIG. 15D, three first modules 510*a*, 510*b*, 510*c* may be disposed on a left upper end, a left lower end, and a right side of the electronic device 101, and the second module 520 may be disposed on a center of the electronic device 101. The second part 1540 of the wiring device may be connected to three connectors provided in the second module 520, and the first parts 910*a*, 910*b*, 910*c* of the wiring device may be connected to the second part 1540 and the first modules 510*a*, 510*b*, 510*c*. To achieve this, the second part 1540 may include three connector parts 1510*a*, 1510*b*, 1510*c*, and may include one pair of ports 1542*a*, 1542*b* for connecting an external measurement device. The external measurement device may be connected to the one pair of ports 1542*a*, 1542*b*, and a target to be tested may be selected by a switch 1544. The switch 1544 may be a switch that is electronically controlled or may be a switch that is physically controlled.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An apparatus for connecting modules included in an electronic device, the apparatus comprising:
   at least one line part comprising lines configured to transmit a power, a control signal, an intermediate frequency (IF) signal, or a radio frequency (RF) signal between a first module of the electronic device and a second module of the electronic device;
   a first connector part configured to connect at least one of the lines with the first module;
   a second connector part configured to connect at least one of the lines with the second module; and
   a connection part configured to connect at least one line for transmitting the IF signal or the RF signal from among the lines with at least one external device,
   wherein the at least one line for transmitting the IF signal or the RF signal comprises a first line connected to the first connector part to exchange signals with the first module, and a second line connected to the second connector part to exchange signals with the second module,
   wherein the connection part comprises a first port connected with the first line and a second port connected with the second line,
   wherein the line part comprises a first line part and a second line part,
   wherein the first line part is connected with the first connector part and a first intermediate connector part,
   wherein the second line part is connected with the second connector part, the connection part, and a second intermediate connector part,
   wherein the first intermediate connector part is connected with the second connector part through the second intermediate connector part, and
   wherein the first intermediate connector part and a fourth intermediate connector part have a removable structure.

2. The apparatus of claim 1, wherein the at least one line part comprises:
   a first line part configured to connect between the first connector part and the second connector part; and
   a second line part configured to connect between the second connector part and the connection part.

3. The apparatus of claim 2, wherein the first line part is connected with the second connector part on one surface of the second connector part, and
   wherein the second line part is connected with the second connector part on the other surface positioned opposite to the one surface of the second connector part.

4. The apparatus of claim 1, wherein the at least one line part is configured with a flexible printed circuit board (FPCB).

5. The apparatus of claim 1, wherein the first connector part comprises a first connector comprising at least one port to connect at least one of the lines with a circuit in the first module, and
 wherein the second connector part comprises a second connector comprising at least one port to connect at least one of the lines with a circuit in the second module.

6. The apparatus of claim 5, wherein the second connector part is connected with the connection part through one line part of the at least one line part, and
 wherein the second connector protrudes in a direction perpendicular to a direction in which the one line part is connected.

7. The apparatus of claim 5, wherein the first connector is configured to protrude from a first substrate included in the first connector part in a first direction, and
 wherein the second connector is configured to protrude from a second substrate included in the second connector part in a second direction which is opposite to the first direction.

8. The apparatus of claim 1, wherein the first module comprises a circuit configured to process an RF band signal, and
 wherein the second module comprises a circuit configured to process a baseband signal and an IF band signal.

9. The apparatus of claim 8, wherein the first module comprises a circuit configured to process a millimeter wave band signal, and
 wherein the second module comprises a circuit configured to process a baseband signal and a band signal which is lower than the millimeter wave band.

10. The apparatus of claim 1, wherein the first module comprises at least one antenna.

11. The apparatus of claim 1, wherein the at least one line part comprises:
 a first line part configured to connect between the first connector part and the connection part; and
 a second line part configured to connect between the connection part and the second connector part.

12. The apparatus of claim 1, further comprising a third connector part configured to connect with a third module which is a same kind of module as the first module.

13. The apparatus of claim 12, further comprising a switch configured to selectively connect any one of a path with the first module and a path with the third module with the at least one external device.

14. The apparatus of claim 1, wherein the connection part comprises at least one port configured to connect the at least one external device, and at least one circuit element configured to process a signal transmitted to the at least one external device.

* * * * *